United States Patent
Shibahara et al.

(10) Patent No.: US 9,100,655 B2
(45) Date of Patent: Aug. 4, 2015

(54) MOTION COMPENSATION METHOD, IMAGE DECODING METHOD, IMAGE CODING METHOD, MOTION COMPENSATION APPARATUS, PROGRAM, AND INTEGRATED CIRCUIT

(75) Inventors: Youji Shibahara, Osaka (JP); Steffen Wittmann, Moerfelden-Walldorf (DE); Takahiro Nishi, Nara (JP); Hisao Sasai, Osaka (JP); Kyoko Tanikawa, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 420 days.

(21) Appl. No.: 13/638,681

(22) PCT Filed: Apr. 1, 2011

(86) PCT No.: PCT/JP2011/001981
§ 371 (c)(1),
(2), (4) Date: Oct. 1, 2012

(87) PCT Pub. No.: WO2011/129067
PCT Pub. Date: Oct. 20, 2011

(65) Prior Publication Data
US 2013/0034164 A1 Feb. 7, 2013

(30) Foreign Application Priority Data
Apr. 13, 2010 (JP) ................................ 2010-092667

(51) Int. Cl.
*H04N 19/51* (2014.01)
(52) U.S. Cl.
CPC ..................... *H04N 19/51* (2014.11)

(58) Field of Classification Search
None
See application file for complete search history.

(56) References Cited

U.S. PATENT DOCUMENTS

| 6,735,340 | B1 | 5/2004 | Ohno |
| 7,881,376 | B2 | 2/2011 | Iguchi et al. |
| 8,165,219 | B2 | 4/2012 | Cismas |

(Continued)

FOREIGN PATENT DOCUMENTS

| JP | 10-215457 | 8/1998 |
| JP | 11-298903 | 10/1999 |
| JP | 2006-520551 | 9/2006 |
| JP | 4436782 | 3/2010 |

(Continued)

OTHER PUBLICATIONS

International Search Report issued Jun. 28, 2011 in International (PCT) Application No. PCT/JP2011/001981.

*Primary Examiner* — Dave Czekaj
*Assistant Examiner* — Nam Pham
(74) *Attorney, Agent, or Firm* — Wenderoth, Lind & Ponack, L.L.P.

(57) ABSTRACT

A motion compensation method includes: specifying, using a motion vector of a current block, a reference image area for use in motion compensation for each of the current block and a current sub-block spatially adjacent to the current block, to read out reference pixel data of the specified area from a frame memory; performing motion compensation using the reference pixel data read out in the readout, to generate prediction pixel data for each of the current block and the current sub-block; outputting the prediction pixel data for the current block, generated in the performing of motion compensation; and temporarily storing the prediction pixel data for the current sub-block, generated in the performing of motion compensation.

10 Claims, 32 Drawing Sheets

(56) References Cited

U.S. PATENT DOCUMENTS

| | | |
|---|---|---|
| 2004/0190632 A1 | 9/2004 | Cismas |
| 2005/0254581 A1 | 11/2005 | Iguchi et al. |
| 2010/0086053 A1 | 4/2010 | Okada et al. |
| 2012/0044996 A1* | 2/2012 | Sato .................. 375/240.16 |

FOREIGN PATENT DOCUMENTS

| | | |
|---|---|---|
| WO | 2004/079916 | 9/2004 |
| WO | 2008/117440 | 10/2008 |
| WO | 2008/136178 | 11/2008 |

* cited by examiner

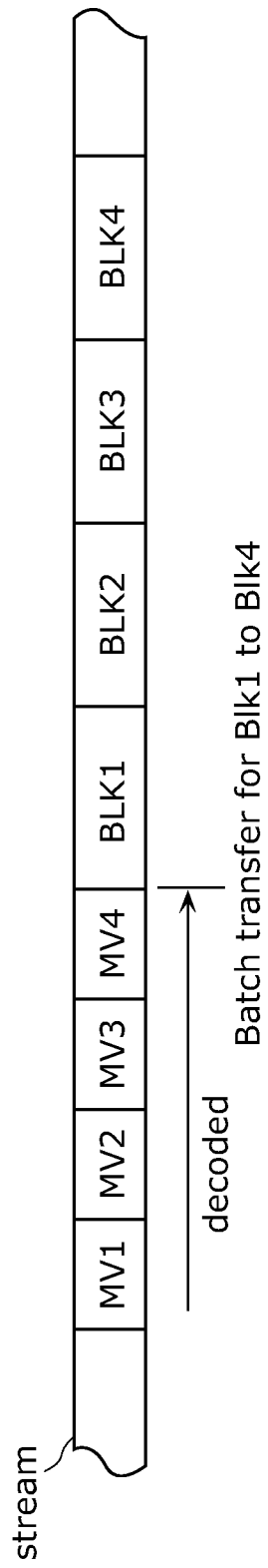

FIG. 20
Stream of TS packets
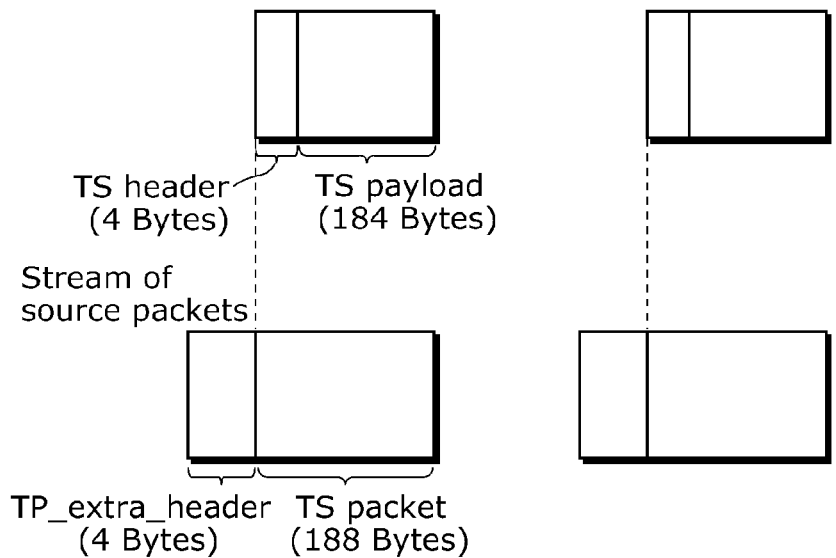
Multiplexed data
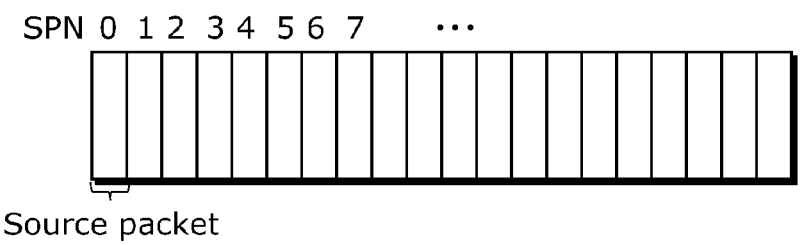
FIG. 21
Data structure of PMT
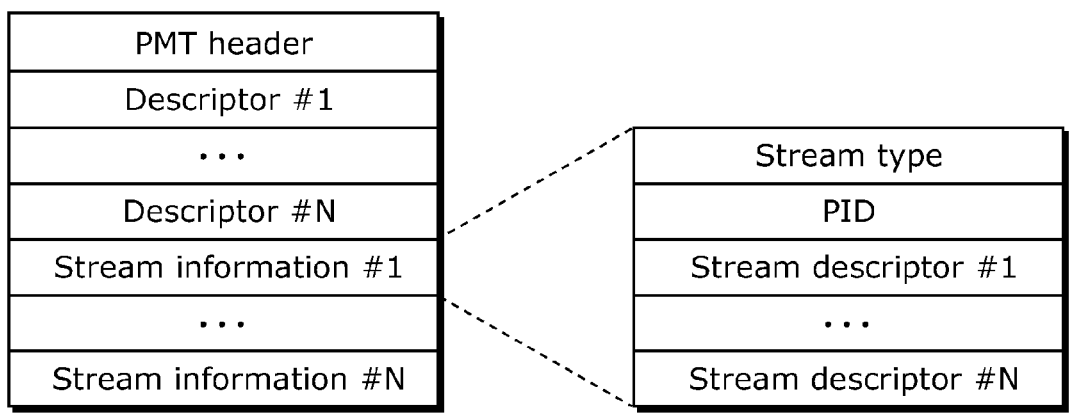

(a)

(b)

MOTION COMPENSATION METHOD, IMAGE DECODING METHOD, IMAGE CODING METHOD, MOTION COMPENSATION APPARATUS, PROGRAM, AND INTEGRATED CIRCUIT

TECHNICAL FIELD

The present invention relates to a motion compensation method, and especially relates to increasing memory transfer efficiency of motion compensation in a moving picture coding method, a moving picture decoding method, and a moving picture coding apparatus and a moving picture decoding apparatus for achieving high coding efficiency.

BACKGROUND ART

In recent years, along with the development of multimedia applications, a variety of media information such as images, voice, text, and the like are integrally handled. At this time, by digitization of all the media, it is possible to integrally handle the media. However, since the digitized images contain a huge amount of data, a technique for compressing image information is essential for storing and transmitting data.

On the other hand, it is also important to standardize a compression technique such that compressed image data are interoperable. Image compression standards include, for instance, International Telecommunication Union Telecommunication Standardization Sector (ITU-T) standards denoted with H. 261 and H. 263, International Organization for Standardization/International Electrotechnical Commission (ISO/IEC) standards denoted with Moving Picture Experts Group (MPEG)-1, MPEG-2, and MPEG-4. There is also a standard called H. 264 (MPEG-4AVC) that Joint Video Team which is a tie-up of ITU-T and MPEG is working toward standardization.

Generally, in the coding of a moving picture, an amount of information is compressed by reducing redundancy in temporal and spatial directions. In the inter prediction coding for reducing a temporal redundancy, motion estimation is performed and a prediction image is generated on a block-by-block basis with reference to a previous or subsequent picture, and coding is performed on a different value between the obtained prediction image and the current picture to be coded. Here, a picture is a term to represent a screen, and it represents a frame when used for a progressive image, whereas it represents a frame or a field when used for an interlaced image. Here, the interlaced image is an image in which one frame is composed of two fields having different time. In the coding and decoding of the interlaced image, one frame can be processed as a frame, and as two fields, and as a frame structure or a field structure for each block in the frame.

A picture on which an intra prediction coding is performed without a reference image is referred to as an I picture. A picture on which an inter prediction coding is performed with reference only to a reference image is referred to as a P picture. A picture on which an inter prediction coding is performed with reference to two reference images simultaneously is referred to as a B picture. The B picture can refer to two pictures, as any combination of pictures, selected from the pictures whose delay time is forward or backward. Whereas reference images (reference pictures) can be specified for each macroblock that is a basic unit of coding, they are distinguished as a first reference picture and a second reference picture. The first reference picture is a reference picture which is described in advance in a coded bit stream, and the second reference picture is a reference picture which is described later. It should be noted that the reference pictures need to be already coded as a condition for coding the pictures.

A motion compensation inter prediction coding is used for coding the P picture or the B picture. The motion compensation inter prediction coding is a method which applies motion compensation to the inter prediction coding. Motion compensation is a method for improving prediction accuracy and reducing an amount of data by not simply predicting from a pixel value of a reference frame but estimating an amount of motion in each part of the picture (hereafter called motion vector) and by performing a prediction in consideration of the amount of motion. For example, the amount of data is reduced by estimating a motion vector of the current picture to be coded and coding a prediction residual between a prediction value which is shifted by the motion vector and the current picture to be coded. Since, in the case of this method, information about the motion vector is necessary in decoding, the motion vector is also coded, and recorded, or transmitted.

The motion vector is estimated on a macroblock-by-macroblock basis. More specifically, the motion vector is estimated by fixing the macroblock on the side of the current picture to be coded, shifting the macroblock on the side of the reference picture within a search range, and finding the position of the reference block which is the most similar to the base block.

FIG. 1 is a block diagram showing a configuration of a conventional inter prediction coding apparatus.

The inter prediction coding apparatus includes a motion estimation unit 101, a frame memory 102, subtraction units 103 and 104, a motion compensation unit 105, a coding unit 106, an addition unit 107, a motion vector memory 108, and a motion vector prediction unit 109.

FIG. 2 is a block diagram showing a configuration of the conventional inter prediction decoding apparatus.

The conventional inter prediction decoding apparatus shown in FIG. 2 is an apparatus which decodes coded signal Str which is coded by the conventional inter prediction coding apparatus shown in FIG. 1 to output decoded screen signal Vout. The conventional inter prediction decoding apparatus includes the frame memory 102, the motion compensation unit 105, addition units 107 and 121, the motion vector memory 108, the motion vector prediction unit 109, a decoding unit 122, a local reference memory 123, and a transfer control unit 124.

Among constituent components shown in each of FIGS. 1 and 2, the transfer control unit 124 is a control circuit (constituting area specifying means and reference pixel transfer means) which reads, from the frame memory 102, pixel data of a reference area indicated by a motion vector in a reference picture indicated by reference picture number RefNo. The transfer control unit 124 performs a control of the frame memory 102 with a control signal Ctrl1, and performs a control of the motion compensation unit 105 with a control signal Ctrl2. With this, it is possible to correctly decode a decoded picture signal Vout, that is, a decoded picture RecPel from the coded signal Str.

It should be noted that the coding and decoding are performed by a unit called a 16×16 pixel macroblock. For example, in H. 264, a motion compensation block is used for coding and decoding by selecting an appropriate block size from seven motion compensation block sizes or macroblock sizes of 4×4, 4×8, 8×4, 8×8, 8×16, 16×8, and 16×16 (hereafter, referred to as a small block or sub-block for making a story short). Here, the macroblock can be divided into macroblock partitions (four for the 8×8 size, two for the 8×16 size, and two for the 16×8 size, or one for the 16×16). Moreover, the 8×8 macroblock partitions each can be further divided into sub-macroblock partitions (four for the 4×4 size, two for the 4×8 size, and two for the 8×4 size, or one for the 8×8). In other words, the macroblock can be divided into small blocks by two stages.

Here, when the macroblock is divided into smaller motion compensation blocks, an overhead of a transfer of the reference pixel data increases, with a result that a bus occupancy rate increases. Patent Literature 1 checks motion vectors MV of a plurality of motion compensation blocks in a macroblock and the reference picture numbers RefNo, and increase memory transfer efficiency by performing a batch transfer in the case of the transfers from the same position within a certain range.

CITATION LIST

Patent Literature

[PTL 1]
Japanese Patent No. 4436782

SUMMARY OF INVENTION

Technical Problem

However, Patent Literature 1 refers to a method for transferring, in a batch, reference pixel data of a plurality of small blocks included in a similar macroblock, but does not refer to the other cases. In other words, determination on the batch transfer of the reference pixel data corresponding to a plurality of small blocks cannot be made without obtaining information about the source positions of the small blocks (motion vector and coordinate information of the block). For example, since small blocks belonging to mutually different macroblocks have different timing for obtaining a motion vector, it is impossible to generate an effect of reducing the memory transfer.

The present invention is proposed in view of the above mentioned problems, and has an object to provide a motion compensation method which increases transfer efficiency of the reference pixel data, and an image coding method and an image decoding method using the motion compensation method.

Solution to Problem

A motion compensation method according to an aspect of the present invention is a motion compensation method for performing motion compensation using a reference image stored in a frame memory to sequentially output prediction pixel data per block included in an image or per sub-block obtained by further dividing the block. More specifically, the motion compensation method includes: specifying, in the reference image, an area for use in motion compensation for each of a current block and a current sub-block which is spatially adjacent to the current block by using a motion vector for the current block, and reading out reference pixel data of the specified area from the frame memory; performing motion compensation using the reference pixel data read out in the reading out, to generate the prediction pixel data for each of the current block and the current sub-block; outputting the prediction pixel data of the current block generated in the performing of motion compensation; and temporarily storing the prediction pixel data of the current sub-block generated in the performing of motion compensation.

With this configuration, since the reference pixel data of the current sub-block is read out when the reference pixel data of the current block is read out, it is possible to increase readout efficiency (transfer efficiency) from the frame memory.

For example, in the reading out, only when a difference in processing order between the current block and the current sub-block is within a predetermined threshold range, the reference pixel data for each of the current block and the current sub-block may be read out from the frame memory. With this, it is possible to reduce a storage capacity in the temporal storage step.

Furthermore, in the case where the prediction pixel data of the current sub-block is output, (i) in the case where the motion vector of the current block matches a motion vector of the current sub-block, in the outputting, the prediction pixel data of the current sub-block stored in the temporarily storing may be output. Furthermore, (ii) in the case where the motion vector of the current block does not match the motion vector of the current sub-block, in the reading out, the reference pixel data of the current sub-block is read out from the frame memory, the reference pixel data being in the reference image, in the performing of motion compensation, motion compensation is performed by using the reference pixel data read out in the reading out and the motion vector of the current sub-block, and the prediction pixel data of the current sub-block is generated, and in the outputting, the prediction pixel data of the current sub-block generated in the performing of motion compensation may be output.

In this way, the process can be efficient by outputting the prediction pixel data which is generated in advance and stored in the temporal storage step.

An image decoding method according to an aspect of the present invention is a method for decoding a coded stream to generate a decoded image. More specifically, the image decoding method includes: the above described motion compensation method; and generating the decoded image from the coded stream, using the prediction pixel data which is output by the motion compensation method. An image coding method according to an aspect of the present invention is a method for coding images to generate a coded image. More specifically, the image coding method includes: the above described motion compensation method; and generating the coded stream from the image by using the prediction pixel data which is output in the motion compensation method.

An image coding method according to another aspect of the present invention is a method for sequentially coding a plurality of blocks included in the image. More specifically, he image coding method includes: determining a unit of coding for a current block; determining a motion vector of the current block for each unit of coding; and coding pixel data of the current block for each unit of coding by using the motion vector. In the determining of a unit of coding, in the case where a difference in coding order between an adjacent block which is an already coded block and is spatially adjacent to the current block and the current block is within a predetermined threshold range, it is determined that the unit of coding for the current block is a sub-block unit which is obtained by further dividing the current block. In the determining of a motion vector, it is determined that in the current block, a motion vector of a sub-block on a side in contact with the adjacent block is identical to a motion vector of the adjacent block.

With this, it is not necessary to include, in a coded stream, a motion vector of a sub-block on the side in contact with an adjacent block. As a result, coding efficiency is increased.

For example, in the determining of a motion vector, in the case where the current block is divided into a left sub-block and a right sub-block, it may be determined that a motion vector of the left sub-block of the current block is identical to a motion vector of the adjacent block which is adjacent to the left sub-block of the current block. Meanwhile, in the case where the current block is divided into a top sub-block and a bottom sub-block, it may be determined that a motion vector of the top sub-block of the current block is identical to a motion vector of the adjacent block which is adjacent to the top sub-block of the current block.

A motion compensation method according to an aspect of the present invention performs motion compensation using a reference image stored in a frame memory to sequentially output prediction pixel data per block included in an image or per sub-block obtained by further dividing the block. More specifically, the motion compensation apparatus includes: a readout unit configured to specify, in the reference image, an area for use in motion compensation for each of a current block and a current sub-block which is spatially adjacent to the current block using a motion vector of the current block, and to read out reference pixel data of the specified area from the frame memory; a motion compensation unit configured to perform motion compensation using the reference pixel data read out in the readout unit and to generate the prediction pixel data for each of the current block and the current sub-block; an output unit configured to output the prediction pixel data of the current block generated by the motion compensation unit; and a temporary storage unit configured to temporarily store the prediction pixel data of the current sub-block generated by the motion compensation unit.

A program according to an aspect of the present invention causes a computer to perform motion compensation using a reference image stored in a frame memory to sequentially obtain prediction pixel data per block included in an image or per sub-block obtained by further dividing the block. More specifically, the program causes a computer to execute: specifying, in the reference image, an area for use in motion compensation for each of a current block and a current sub-block which is spatially adjacent to the current block by using a motion vector of the current block, and reading out reference pixel data of the specified area from the frame memory; performing motion compensation using the reference pixel data read out in the reading out, to generate the prediction pixel data for each of the current block and the current sub-block; outputting the prediction pixel data of the current block generated in the performing of motion compensation; and temporarily storing the prediction pixel data of the current sub-block generated in the performing of motion compensation.

An integrated circuit according to an aspect of the present invention performs motion compensation using a reference image stored in a frame memory to sequentially output prediction pixel data per block included in an image or per sub-block obtained by further dividing the block. More specifically, the integrated circuit includes: a readout unit configured to specify, in the reference image, an area for use in motion compensation for each of a current block and a current sub-block which is spatially adjacent to the current block using a motion vector of the current block, and to read out reference pixel data of the specified area from the frame memory; a motion compensation unit configured to perform motion compensation using the reference pixel data read out in the readout unit and to generate the prediction pixel data for each of the current block and the current sub-block; an output unit configured to output the prediction pixel data of the current block generated by the motion compensation unit; and a temporary storage unit configured to temporality store the prediction pixel data of the current sub-block generated by the motion compensation unit.

Advantageous Effects of Invention

The motion compensation apparatus according to the present invention can realize high coding efficiency while reducing the amount of memory transfer necessary for motion compensation.

BRIEF DESCRIPTION OF DRAWINGS

FIG. 6A is a diagram showing an example of a data structure of a coded stream.

FIG. 20 is a diagram showing a structure of TS packets and source packets in the multiplexed data.

FIG. 21 is a diagram showing a data structure of a PMT.

DESCRIPTION OF EMBODIMENTS

Embodiment 1

In the inter prediction coding using motion compensation, pixel data of an area indicated by a motion vector in the coded image (reference image) is used as a prediction signal, and an amount of information is reduced by coding only a residual signal (RecDifPic) which is a difference between the coded block and the prediction signal. When the accuracy of motion compensation is increased by performing motion compensation on a basis of a block having a small size, the amount of information of the residual signal can be reduced. On the other hand, however, since the amount of information of the motion vector increases, the amount of information of the residual signal and the amount of information of the motion vector are in a trade-off relationship.

The image coding apparatus determines a motion vector by searching within a search range of a reference image such that the compression efficiency for the current block becomes maximum. Therefore, the image coding apparatus according to an aspect of the present invention has a feature of searching a motion vector with high compression efficiency and preferentially determining a motion vector with a possibility that a memory transfer load is reduced by the image decoding apparatus.

More specifically, the image coding apparatus according to the present invention favors the motion vector or limits the motion compensation to the motion vector which is the same as that of the spatially adjacent other block, even in the case where a frequency of motion compensation in which the memory transfer load is increased and which is on a basis of block having a small size is reduced, or in the case where motion compensation is performed on a basis of block having a small size.

Figure 1:
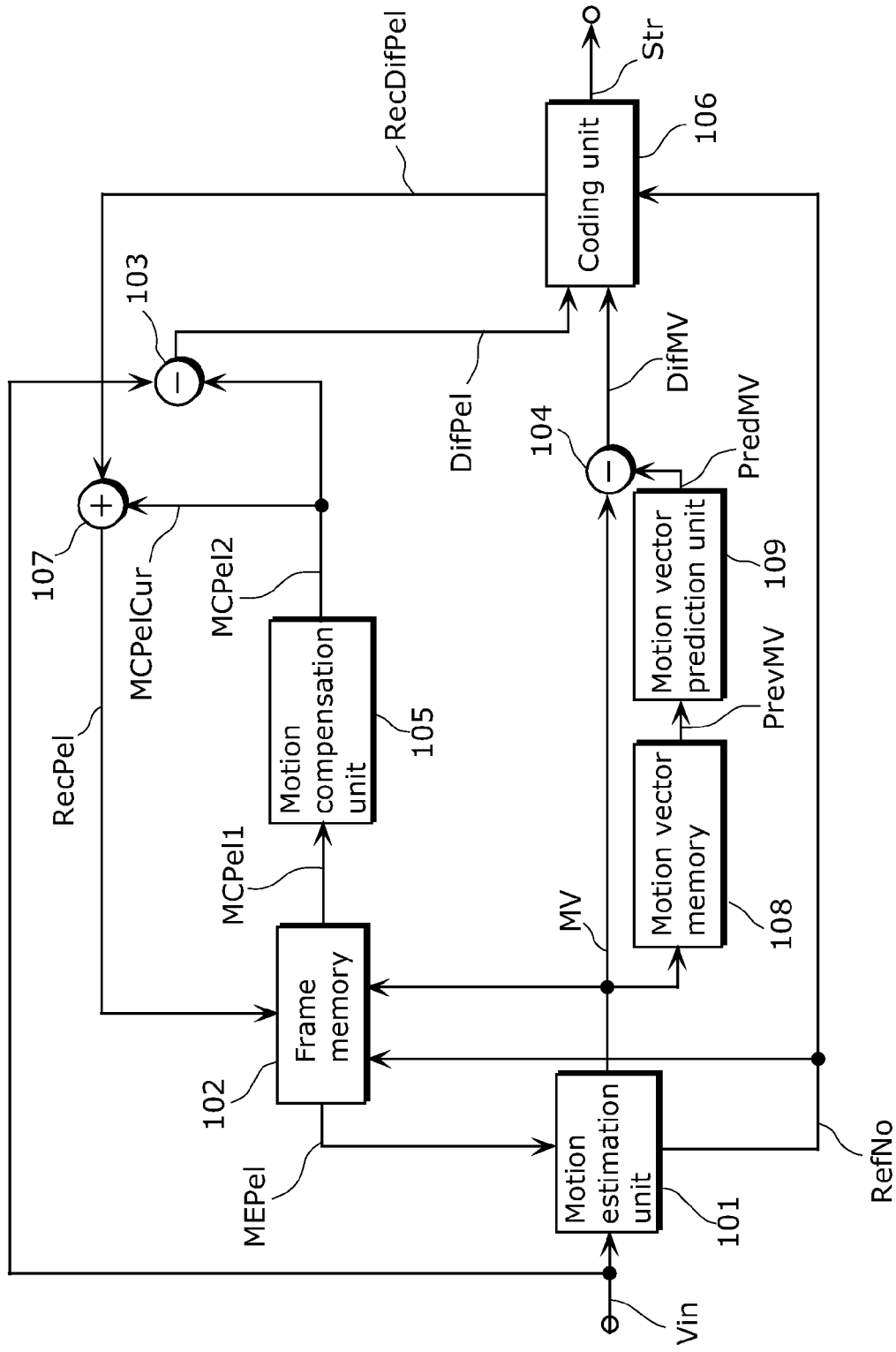
FIG. 1 is a block diagram showing a conventional inter prediction coding apparatus.
Figure 2:
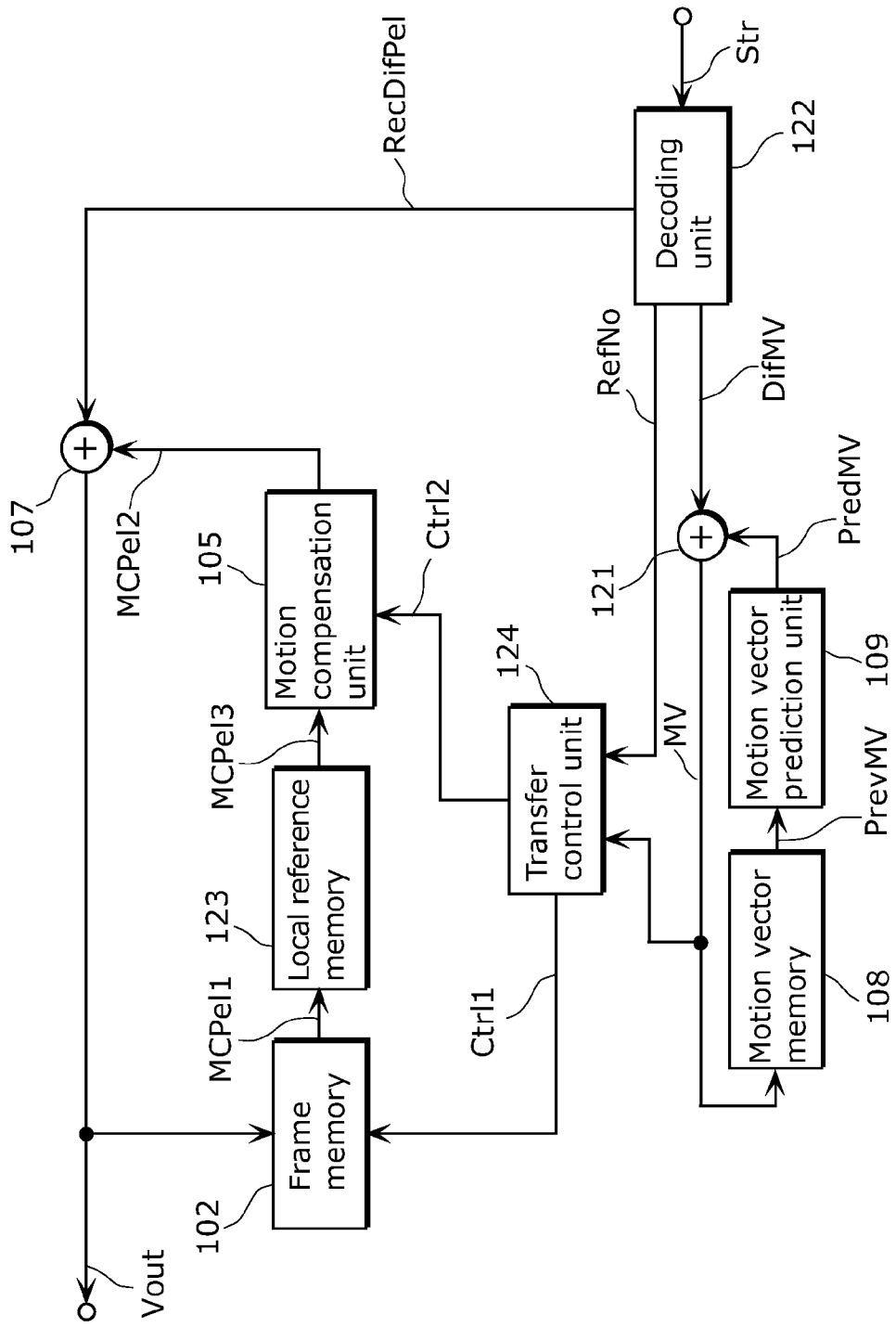
FIG. 2 is a block diagram showing a conventional inter prediction decoding apparatus.
Figure 3A:
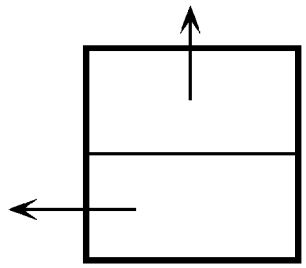
FIG. 3A is a conceptual diagram of a reference position of a prediction vector in the case where a 16×16 pixel block in H. 264 is divided into 16×8 pixel partitions.

FIG. 3A is a conceptual diagram of a reference position of a prediction vector in the case where a 16×16 pixel block in H.264 is divided into 16×8 pixel partitions (also referred to as sub-blocks). The topside 16×8 pixel partition determines that the motion vector of the block adjacent to the topside is a prediction vector and the downside 16×8 pixel partition determines that the motion vector of the block adjacent to the left side is a prediction vector.

Figure 3B:
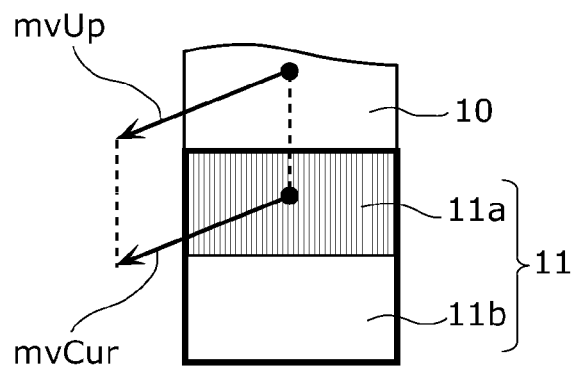
FIG. 3B is a diagram showing an example of a reference position of a prediction vector of the above sub-block among the two halves which are obtained by horizontal division of the block.

As shown in FIG. 3B, in the case where a 16×16 pixel block 11 is divided into the topside and the downside, a motion vector mvCur of a 16×8 pixel sub-block 11a on the topside can reduce the amount of information of the motion vector when equal to a motion vector mvUp of a block 10 that is adjacent to the topside. Therefore, the motion vector is favored or restricted in the motion search process such that only this motion vector is taken.

Figure 3C:
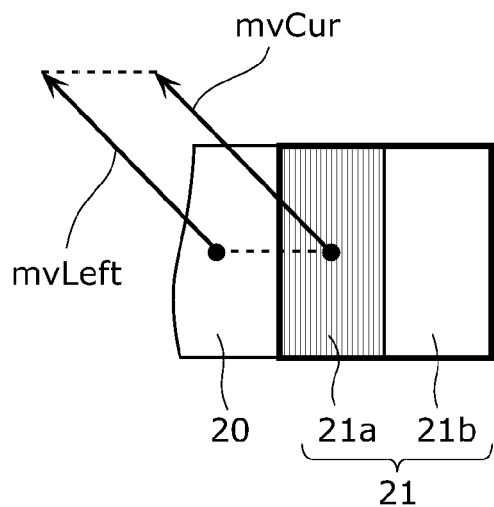
FIG. 3C is a diagram showing an example of a reference position of a prediction vector of the sub-block on the left side among the two halves which are obtained by vertical division of the block into the left and right halves.

As shown in FIG. 3C, in the case where a 16×16 pixel block 21 is divided into the left and right halves, a motion vector mvCur of an 8×16 pixel sub-block 21a on the left side can reduce the amount of information of the motion vector when equal to a motion vector mvLeft of a block 20 adjacent to the left side. Therefore, in the motion search process, the motion vector is favored or restricted in the motion search process such that only this motion vector is taken.

In other words, as shown in FIGS. 3B and 3C, in the case where the blocks 11 and 12 are divided into sub-blocks 11a and 11b, and sub-blocks 21a and 21b, respectively, motion compensation is performed on the sub-blocks 11a and 21a which are adjacent to the already coded blocks 10 and 20, with the use of the motion vector which is identical to the motion vector of the adjacent blocks 10 and 20.

Figure 4A:
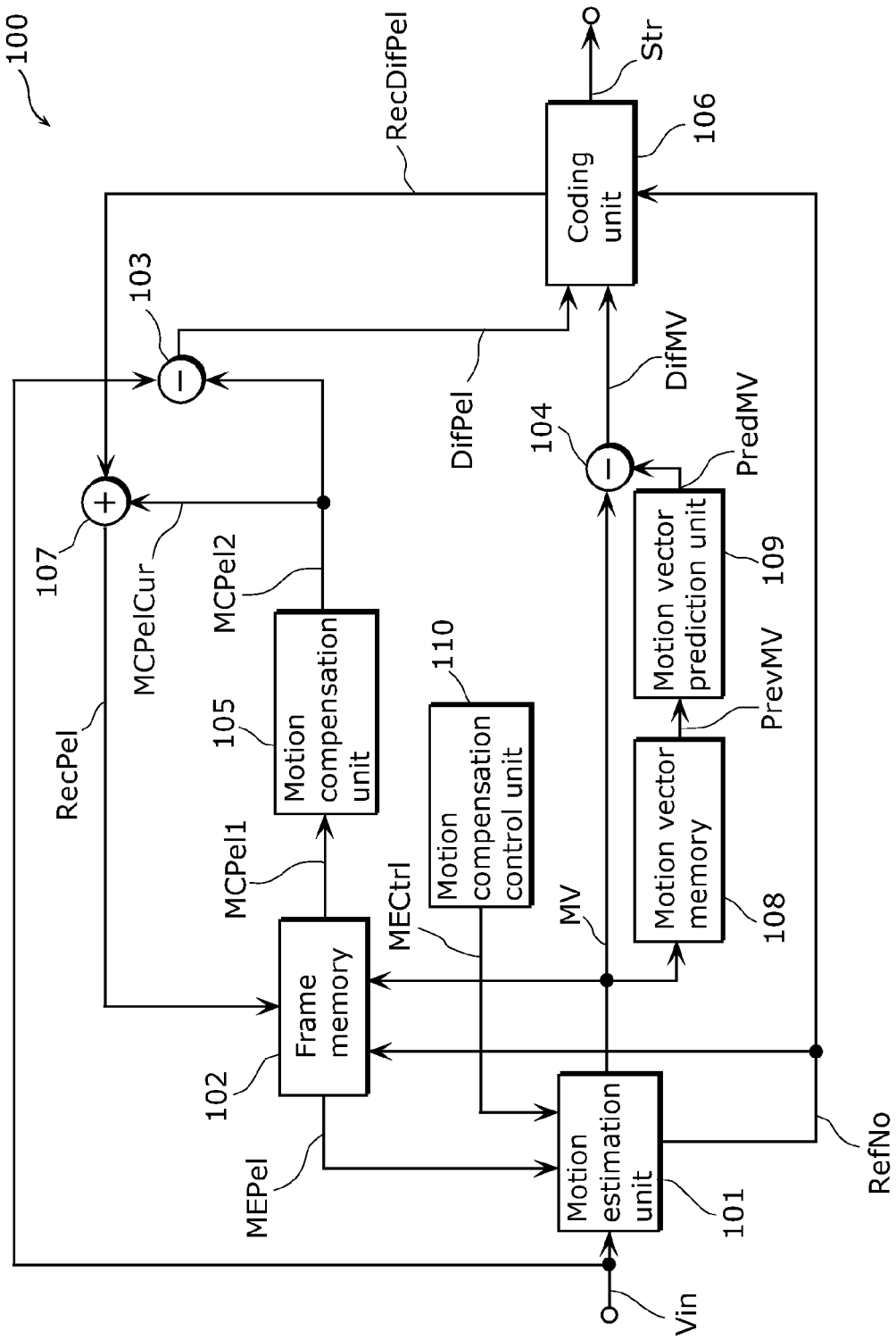
FIG. 4A is a block diagram showing a configuration of an image coding apparatus according to the present embodiment.

FIG. 4A is a block diagram showing a configuration of an image coding apparatus 100 according to the present embodiment.

The image coding apparatus 100 shown in FIG. 4A includes the motion estimation unit 101, the frame memory 102, the subtraction units 103 and 104, the motion compensation unit 105, the coding unit 106, the addition unit 107, the motion vector memory 108, the motion vector prediction unit 109, and a motion compensation control unit 110.

The motion estimation unit 101 compares a motion estimation reference pixel MEpel output from the frame memory 102 with a screen signal Vin to output a motion vector MV and a reference picture number RefNo. The reference picture number RefNo is an identification signal for specifying a reference image which is selected from a plurality of reference images and the current image refers to. The motion vector MV is temporarily stored at the motion vector memory 108 and is then output to the motion vector prediction unit 109 as an adjacent motion vector PrevMV.

The motion vector prediction unit 109 predicts the prediction motion vector PredMV with reference to the input adjacent motion vector PrevMV. The subtraction unit 104 subtracts the prediction motion vector PredMV from the motion vector MV and outputs the difference as a motion vector prediction difference DifMV.

Meanwhile, the frame memory 102 outputs, as a motion compensation reference pixel MCpel1, pixel data of the reference area indicated by the motion vector MV in the reference image indicated in the reference picture number RefNo. The motion compensation unit 105 generates prediction pixel data with fractional pixel precision from the motion compensation reference pixel MCpel1 obtained from the frame memory 102, and outputs the data as a prediction pixel signal MCpel2. The subtraction unit 103 subtracts the prediction pixel signal MCpel2 from the screen signal Vin and outputs the screen prediction error DifPel.

The coding unit 106 performs frequency transform on the screen prediction error DifPel and quantizes it to generate quantized coefficients. Moreover, the coding unit 106 performs a variable length coding on the quantized coefficients, the motion vector prediction difference DifMV, and the reference picture number RefNo to output a coded signal Str. It should be noted that the prediction error RecDifPel as a result of decoding of the screen prediction error in the performing of coding is simultaneously output. The prediction error RecDifPel is obtained by performing inverse quantization and inverse frequency transform on quantized coefficients. In other words, the prediction error RecDifPel is obtained by superimposing the coded error on the screen prediction error DifPel, and matches an inter prediction error obtained by decoding the coded signal Str by an image decoding apparatus 200 to be described later.

The addition unit 107 stores, in the frame memory 102 as a reference image, a decoded pixel signal RecPel obtained by the addition of the prediction error RecDifPel to the prediction pixel signal MCpel2. It should be noted that for an effective use of a capacity of the frame memory 102, an unnecessary area in the reference image stored in the frame memory 102 is released and a reference image without the need to be stored in the frame memory 102 is not stored in the frame memory 102.

The motion compensation control unit 110 transmits a control signal MeCtrl to the motion estimation unit 101 such that the amount of information necessary for decoding the motion vector in the estimation of a partition having a small size, that is, a sub-block, does not become too large, and controls such that a motion vector MV which is equal to the prediction motion vector PredMV as much as possible is estimated. With this, the amount of information of a motion vector prediction difference DifMV is reduced.

Figure 4B:
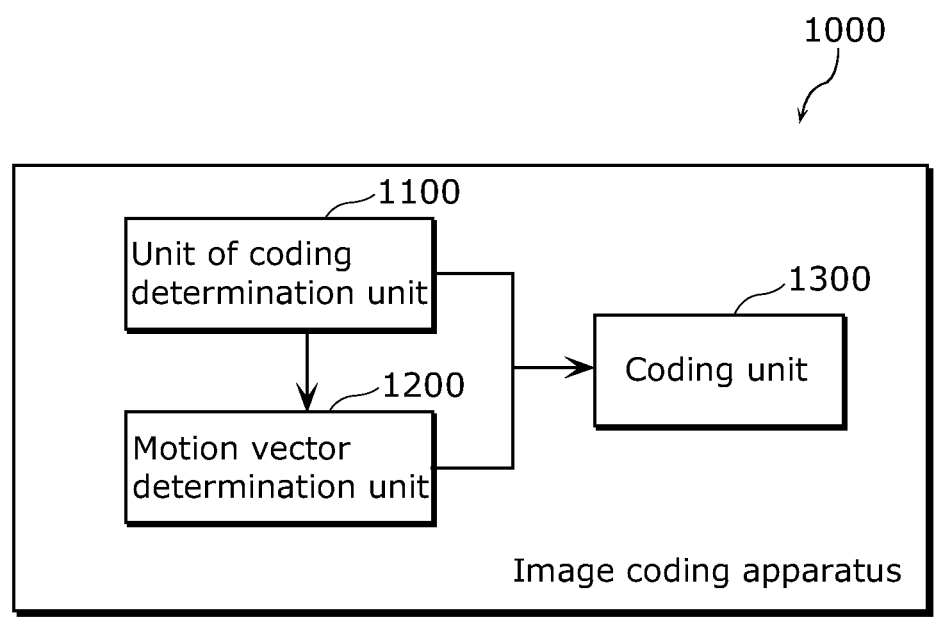
FIG. 4B is a diagram showing another example of a block diagram of an image coding apparatus.

An image coding apparatus 1000 according to an aspect of the present invention, for example, as shown in FIG. 4B, is an apparatus which sequentially decodes a plurality of blocks included in the image. The image coding apparatus 1000 includes a unit of coding determination unit 1100, a motion vector determination unit 1200, and a coding unit 1300.

The unit of coding determination unit 1100 determines a unit of coding of the current block. In other words, the unit of coding determination unit 1100 codes the current block on a block-by-block basis or further divides the current block into a plurality of sub-blocks to determine whether or not to code on a sub-block by sub-block basis. The unit of coding determination unit 1100, for example, is included in the coding unit 106 in FIG. 4A.

More specifically, the unit of coding determination unit 1100 determines that a unit of coding of the current block is a unit of a sub-block that is obtained by a further division of the current block, in the case where a difference in coding order between (i) an adjacent block which is an already coded block and is spatially adjacent to the current block and (ii) the current block is within a predetermined threshold range.

The motion vector determination unit 1200 determines a motion vector on a current block basis in the case where the current block is coded on a block-by-block basis. Meanwhile, the motion vector determination unit 1200 determines a motion vector for each of the sub-blocks in the case where the current block is coded on a sub-block by sub-block basis. The motion vector determination unit 1200, for example, corresponds to the motion estimation unit 101, the motion vector memory 108, the motion vector prediction unit 109, and the motion compensation control unit 110, and the like that are shown in FIG. 4A.

More specifically, the motion vector determination unit 1200 determines that a motion vector of a sub-block in contact with the adjacent block in the current block is identical to a motion vector of the adjacent block, in the case where the current block is coded on a sub-block by sub-block basis. Meanwhile, the motion vector determination unit 1200 determines a motion vector of the sub-block which is not in contact with the adjacent block in the current block in a method that is the same as the method of coding on a block-by-block basis.

The coding unit 1300 codes pixel data of the current block with the use of a motion vector of the current block in the case where the current block is coded on a block-by-block basis, and codes pixel data for each of the sub-blocks with the use of a corresponding motion vector in the case where the current block is coded on a sub-block by sub-block basis. The coding unit 1300, for example, is included in the coding unit 106 in FIG. 4A.

The image coding apparatus 100 and the imaging coding method according to the present embodiment can reduce an amount of information of a motion vector and increase compression efficiency since even in the case where motion compensation is performed on a basis of partition having a small size, a motion vector has a value equal to or near the block adjacent to the topside of the partition or the block adjacent to the left side of the partition.

The image decoding apparatus according to an aspect of the present invention increases memory transfer efficiency by performing batch memory transfer of reference pixel data of a plurality of blocks that are spatially adjacent to each other, in the reference image stored in the frame memory. Especially, memory transfer efficiency is increased with respect to a bit stream generated by the image coding apparatus 100 according to an aspect of the present invention.

Figure 5A:
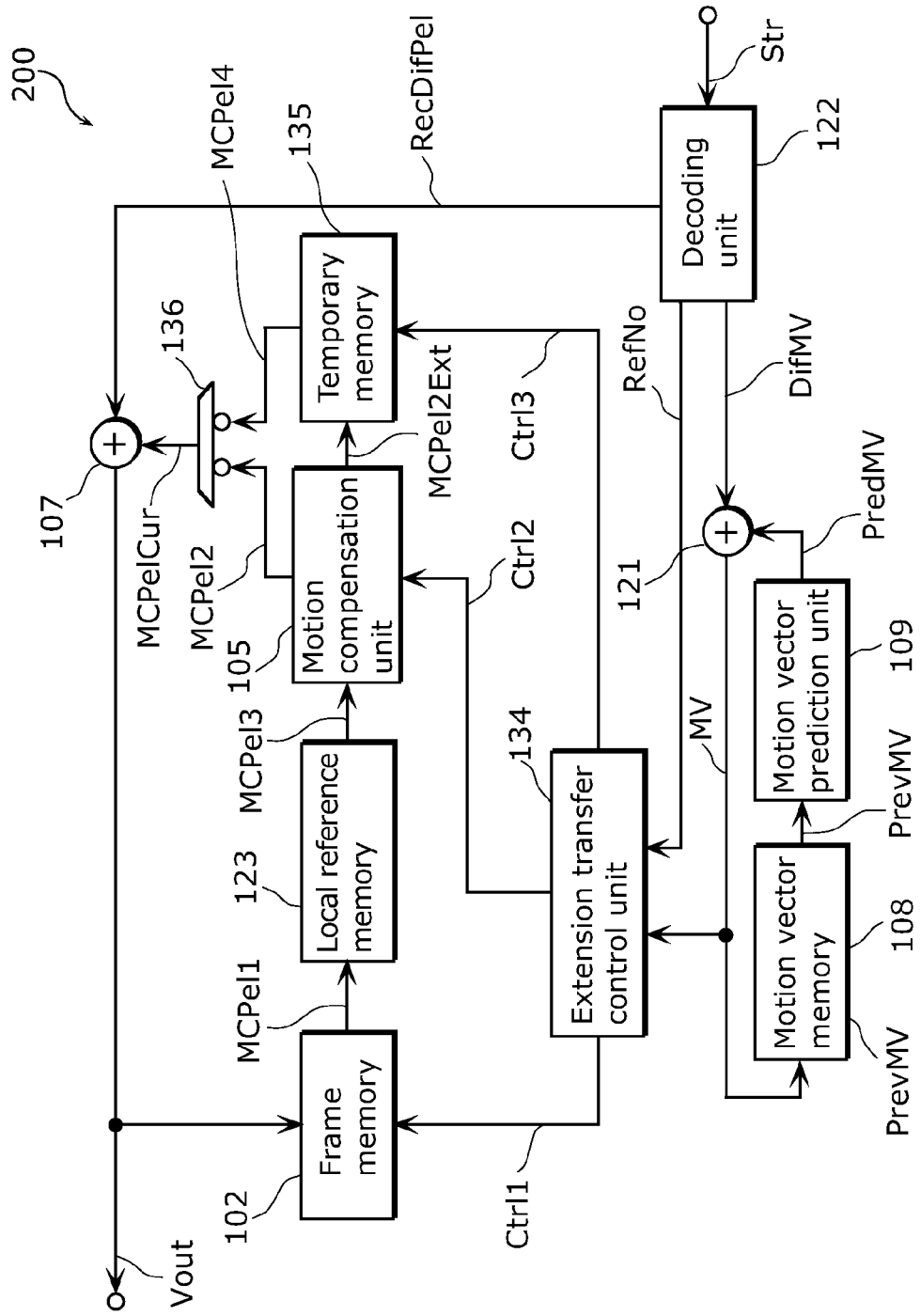
FIG. 5A is a block diagram showing a configuration of an image decoding apparatus according to the present embodiment.

FIG. 5A is a block diagram showing a configuration of the image decoding apparatus 200 according to the present embodiment.

The image decoding apparatus 200 shown in FIG. 5A includes the frame memory 102, the motion compensation unit 105, the addition units 107 and 121, the motion vector memory 108, the motion vector prediction unit 109, a decoding unit 122, the local reference memory 123, an extension transfer control unit 134, a temporary memory 135, and a selector 136.

The decoding unit 122 performs variable length decoding on the coded signal Str to output quantized coefficients, a motion vector prediction difference DifMV, and a reference picture number RefNo. Moreover, the decoding unit 122 performs inverse quantization and inverse frequency transform on quantized coefficients to output a prediction error RecDifPel. The addition unit 121 adds a prediction motion vector PredMV output from the motion vector prediction unit 109 and a motion vector prediction difference DifMV to decode the motion vector MV.

The frame memory 102 outputs, as a motion compensation reference pixel MCpel1, reference pixel data indicated by the motion vector MV in the reference image indicated in the reference picture number RefNo. The local reference memory 123 is a memory located between the frame memory 102 and the motion compensation unit 105, and a motion compensation reference pixel MCpel1 is input from the frame memory 102. The motion compensation reference pixel MCpel1 stored in the local reference memory 123 is referred to only by the motion compensation unit 105.

A reference pixel MCpel3 is output from the local reference memory 123, and is input to the motion compensation unit 105. The motion compensation unit 105 generates prediction pixel data with fractional pixel precision, and outputs the data as a prediction pixel signal MCpel2. The addition unit 107 stores, in the frame memory 102 as a reference image, a decoded pixel signal RecPel obtained by the addition of the prediction error RecDifPel to the prediction pixel signal MCpel2.

It should be noted that for an effective use of a capacity of the frame memory 102, an unnecessary area in the reference image stored in the frame memory 102 is released and a reference image without the need to be stored in the frame memory 102 is not stored in the frame memory 102.

The extension transfer control unit 134, according to the position of the current block and recording situation in the temporary memory 135, gives instructions with a control signal Ctrl1 whether or not extended reference pixel data is transferred from the frame memory 102 to the local reference memory 123.

Especially, even in the case where the motion compensation unit 105 simultaneously performs motion compensation on each of the current block and the subsequent non-decoded block which is decoded after the current block and the case where the motion vector information of the subsequent block cannot be obtained at the time of decoding the current block, by assuming or estimating that the motion vector of the subsequent block is identical to the motion vector of the current block, the extension transfer control unit 134 outputs the control signal Ctrl1 such that it specifies an area for use each in motion compensation of the current block and the subsequent block and simultaneously transfers pixel data of the specified area (reference pixel data) from the frame memory 102 to the local reference memory 123 (hereafter referred to as extension transfer).

Here, the current block is, for example, a 16×16 pixel block. Meanwhile, the subsequent block is, for example, a 16×8 pixel sub-block. Moreover, the sub-block to be the subsequent block is one of the sub-blocks which are obtained by division of the 16×16 pixel block that is spatially adjacent to the current block. More specifically, it is the sub-block on the side adjacent to the current block among a plurality of sub-blocks.

In other words, if the block 10 shown in FIG. 3B is the current block, in a block 11 adjacent to the block 10 in a vertical direction, a sub-block 11a on the topside is a subsequent block. Similarly, if the block 20 shown in FIG. 3C is the current block, a sub-block 21a on the left side of the block 21 adjacent to the block 20 in a left and right direction is a subsequent block.

The motion compensation unit 105 performs motion compensation with the use of the reference pixel data stored in the local reference memory 123 to sequentially generate prediction pixel data on a block-by-block basis which constitutes an image or a sub-block by sub-block basis which is obtained by further division of the block.

For example, the motion compensation unit 105 performs motion compensation with the use of the reference pixel data stored in the local reference memory 123 to generate prediction pixel data for each of the current block and the subsequent block. Then, the motion compensation unit 105 outputs the prediction pixel data of the current block to the selector 136 and stores the prediction pixel data of the subsequent block in the temporary memory 135.

In other words, the motion compensation unit 105 assumes that the motion vector of the current block is identical to the motion vector of the subsequent block, and then performs motion compensation simultaneously on the two blocks. It should be noted that in the case where the extension transfer is not performed from the frame memory 102 to the local reference memory 123, that is, in the case where the reference pixel data for use in the motion compensation of the current block is only transferred, the motion compensation unit 105 performs motion compensation only on the current block.

Moreover, the extension transfer control unit 134 does not transfer reference pixel data in the case where the prediction pixel data of the subsequent block in the temporary memory 135 is already stored in the temporary memory 135 before motion compensation is performed on the subsequent block. The selector 136 reads out prediction pixel data MCPel4 of the subsequent block from the temporary memory 135 and outputs MCPel4 as motion compensation data MCPelCur.

It should be noted that the image decoding apparatus 200 shown in FIG. 5A includes the local reference memory 123. Even in the case where the local reference memory 123 is not present, the extension transfer efficiency including the reference pixel data of the non-decoded subsequent block that is the feature of the image decoding apparatus 200 according to the present invention can be increased. In this case, the extension transfer control unit 134, for example, may instruct the motion compensation unit 105 with the control signal Ctrl2 to read out the reference pixel data for each of the current block and the subsequent block directly from the frame memory 102.

Figure 5B:
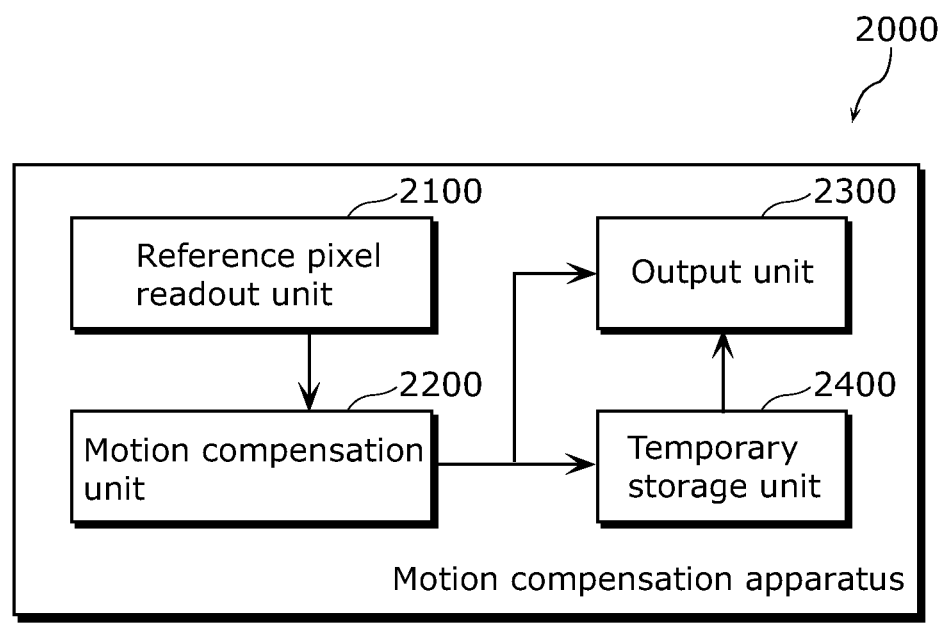
FIG. 5B is a block diagram showing a configuration of a motion compensation apparatus according to the present embodiment.

A motion compensation apparatus 2000 according to an aspect of the present invention as shown in FIG. 5B is an apparatus which sequentially outputs prediction pixel data on a basis of a block included in an image or on a basis of a sub-block obtained by a further division of the block by performing motion compensation with the use of reference image stored in the frame memory 102. The motion compensation apparatus 2000 includes a reference pixel readout unit 2100, a motion compensation unit 2200, an output unit 2300, and a temporary storage unit 2400.

The reference pixel readout unit 2100, in the reference image, separately or collectively reads out, reference pixel data for use in motion compensation for each of the current block and the current sub-block that is spatially adjacent to the current block, from the frame memory 102 and stores the data in the local reference memory 123. The reference pixel readout unit 2100, for example, corresponds to the extension transfer control unit 134 in FIG. 5A.

The reference pixel readout unit 2100, for example, specifies an area in the reference image for use in motion compensation on each of the current block and the current sub-block with the use of the motion vector of the current block in the case where a difference in processing order between the current block and a processing order and the current sub-block is within a predetermined threshold range, collectively reads out the pixel data of the specified area (reference pixel data), and stores the data in the local reference memory 123.

Meanwhile, in the case where the difference in processing order exceeds the threshold, the reference pixel readout unit 2100 separately reads out the reference pixel data of the current block and the current sub-block from the frame memory 102 at a timing for each of the motion compensation processes, and stores the data in the local reference memory 123.

The motion compensation unit 2200 performs motion compensation on the reference pixel data read out from the reference pixel readout unit 2100 to generate prediction pixel data for each of the current block and the current sub-block. The motion compensation unit 2200, for example, corresponds to the motion compensation unit 105 in FIG. 5A.

In the case where the reference pixel data of the current block and the current sub-block in the local reference memory 123 are stored, the motion compensation unit 2200 simultaneously generates the prediction pixel data for each of the current block and the current sub-block with the use of the reference pixel data. Then, the motion compensation unit 2200 outputs the prediction pixel data of the current block via the output unit 2300 to the adding unit 107, and stores the prediction pixel data of the current sub-block in the temporary storage unit 2400.

Meanwhile, in the case where only the reference pixel data of the current block, is stored in the local reference memory 123, the motion compensation unit 2200 generates the prediction pixel data of the current block with the use of the reference pixel data of the current block and outputs the data via the output unit 2300 to the addition unit 107. Likewise, in the case where only the reference pixel data of the current sub-block is stored in the local reference memory 123, the motion compensation unit 2200 generates the prediction pixel data of the current sub-block with the use of the reference pixel data of the current sub-block and outputs the data via the output unit 2300 to the addition unit 107.

The output unit 2300 outputs, to the addition unit 107, the prediction pixel data of the current block or the current sub-block that is generated by the motion compensation unit 2200. The output unit 2300, for example, corresponds to the selector 136 in FIG. 5A.

In the case where the output unit 2300 outputs the prediction pixel data of the current block, the output unit 2300 directly obtains the prediction pixel data from the motion compensation unit 2200 and outputs the data to the addition unit 107. Meanwhile, in the case where the output unit 2300 outputs the prediction pixel data of the current sub-block, the output unit 2300 directly obtains the prediction pixel data from the motion compensation unit 2200 or obtains the prediction pixel data from the temporary storage unit 2400, and outputs the data to the addition unit 107.

For example, in the case where the motion vector of the current block matches the motion vector of the current sub-block, the output unit 2300 outputs the prediction pixel data of the current sub-block obtained from the temporary storage unit 2400. Meanwhile, in the case where the motion vector of the current block does not match the motion vector of the current sub-block, the output unit 2300 outputs the prediction pixel data of the current sub-block directly obtained from the motion compensation unit 2200.

The temporary storage unit 2400 temporarily stores the prediction pixel data of the current sub-block generated by the motion compensation unit 2200. The temporary storage unit 2400, for example, corresponds to the temporary memory 135 in FIG. 5A.

It should be noted that the motion compensation apparatus 2000 with the above configuration may be included in not only the image decoding apparatus 200 but also the image coding apparatus 100. More specifically, the motion compensation unit 105 in FIG. 4A may perform an operation of the motion compensation apparatus 2000.

Figure 6B:
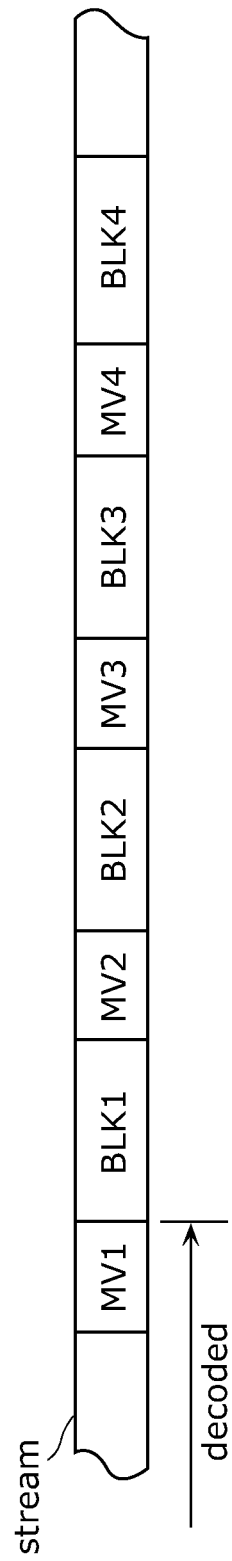
FIG. 6B is a diagram showing another example of a data structure of a coded stream.
Figure 6C:
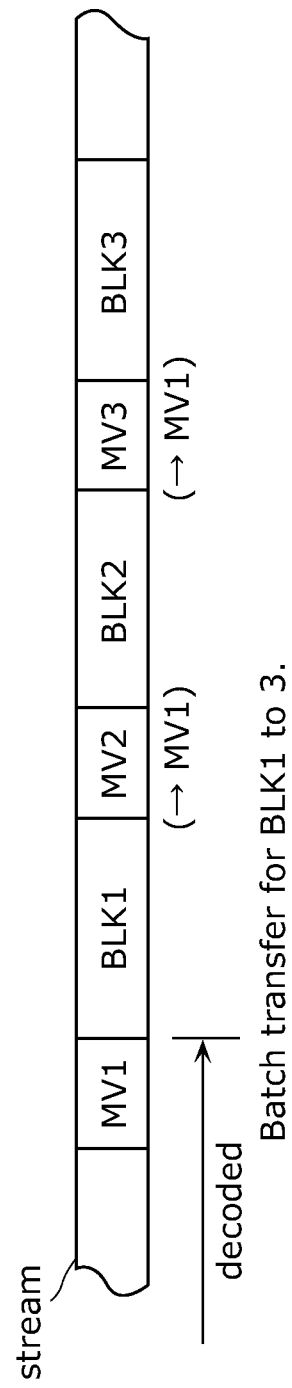
FIG. 6C is a diagram showing another example of a data structure of a coded stream.

Next, with reference to FIGS. 6A to 6C, an example of a data structure of a coded stream generated by the image coding apparatus 100 and decoded by the image decoding apparatus 200 will be described. FIGS. 6A to 6C are diagrams each showing a data structure of a coded stream.

In the coded stream shown in FIG. 6A, the coded data of four blocks (BLK1, BLK2, BLK3, and BLK4) are successively stored in a coding order, and ahead of the four coded data, motion information (MV1, MV2, MV3, and MV4) about each of the blocks are successively stored.

This corresponds to the case where a macroblock in H.264 is divided into four motion compensation blocks (sub-blocks). In this case, the motion information is successively located ahead of the coded data of the four blocks. With this, the image decoding apparatus 200 can determine whether to perform extension transfer after decoding all four pieces of motion information. In other words, among the four blocks, extension transfer of the reference pixel data sharing the motion information may be performed from the frame memory 102 to the local reference memory 123. This can be realized in the conventional image decoding apparatus and the image decoding apparatus 200 according to the present invention.

In a coded stream shown in FIG. 6B, the motion information (MV1, MV2, MV3, and MV4) for each block (BLK1, BLK2, BLK3, and BLK4) is located just ahead of the coded data of the block, and the coded data and the motion information are stored as a pair on a block-by-block basis.

This corresponds to the case where a macroblock in H.264 is not divided into motion compensation blocks. The conventional image decoding apparatus, as shown in FIG. 6A, can perform an operation only in the case where the motion information about a plurality of motion compensation blocks can be obtained in a batch before the coded data. This represents that memory transfer efficiency cannot be increased in an example of FIG. 6B.

The data structure of the coded stream shown in FIG. 6C is the same as the data structure of the coded stream as shown in FIG. 6B. Here, when the image decoding apparatus 200 according to the present invention decodes the moving information (MV1) of the first block (BLK1), it performs extension transform by assuming that the motion information (MV2) of the subsequent block and the motion information (MV3) of the further subsequent block (BLK3) are equivalent to the motion information (MV1) of the block now being decoded (BLK1). If the assumption is correct, the memory transfer efficiency can be increased. As described above, a probability that the motion information is equivalent can be measured by the image decoding apparatus 200, and it can be expected that the assumption can be correct with high accuracy.

Figure 7A:
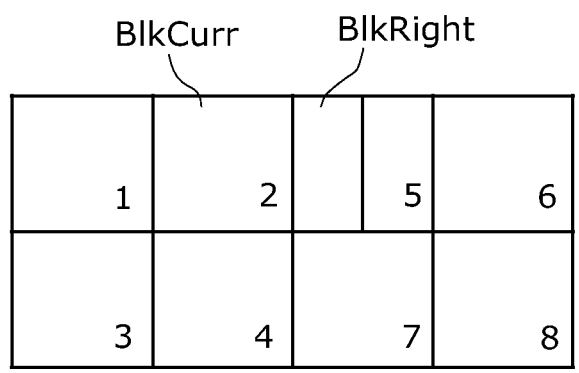
FIG. 7A is a diagram showing the position for each of the blocks included in an image and a coding order (or a decoding order).
Figure 7B:
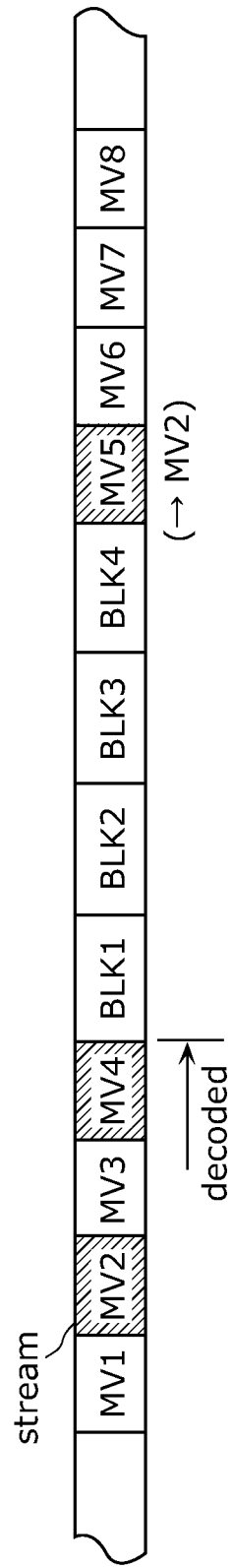
FIG. 7B is an example of a coded stream in which motion information according to blocks each having decoding orders of 1 to 4 is successively located.
Figure 8:
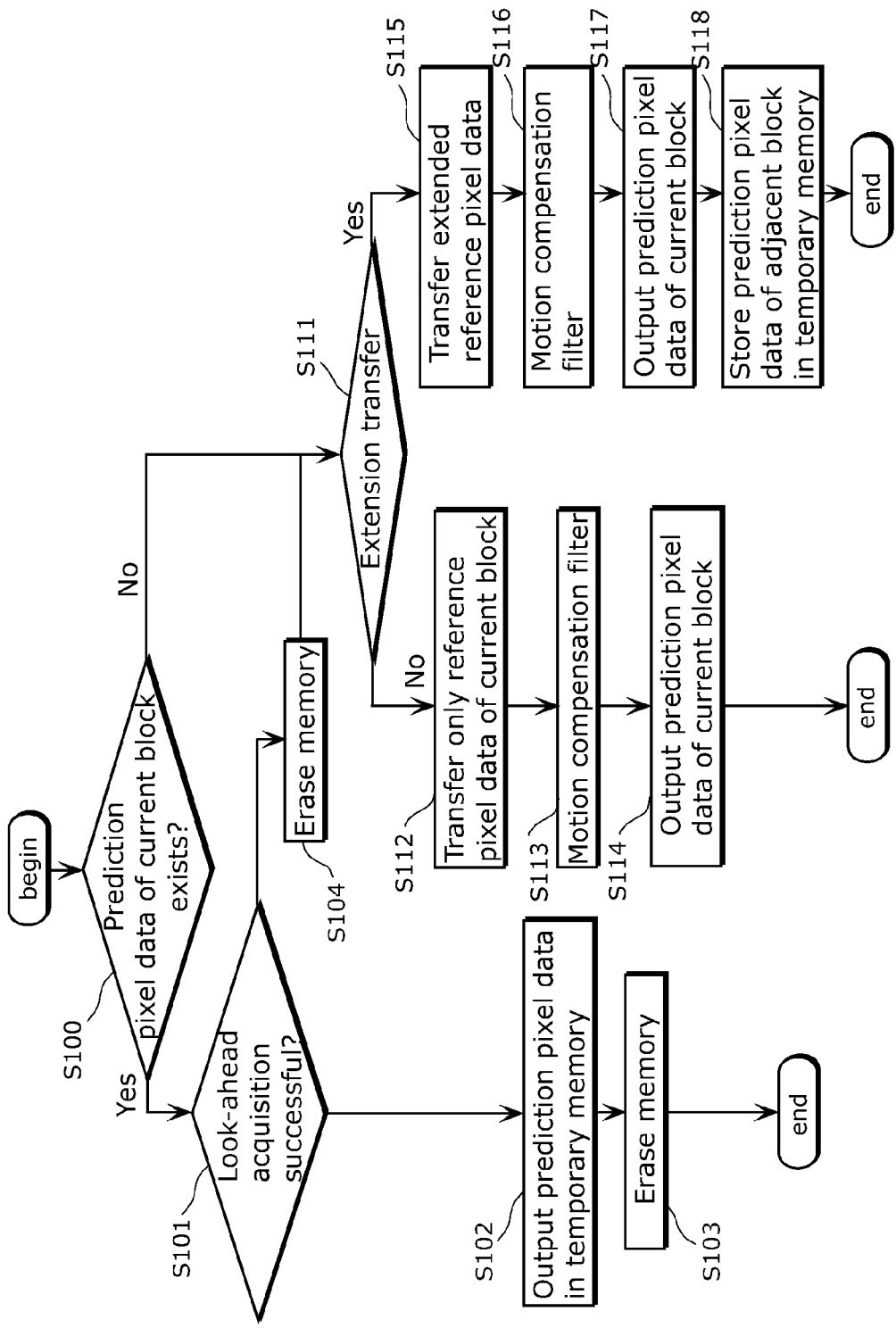
FIG. 8 is an operational flow diagram of the image decoding apparatus according to the present embodiment.

Next, with reference to FIGS. 7A, 7B, and 7C, an operation of the image decoding apparatus 200 according to the present embodiment (image decoding method) will be described. FIG. 7A is a diagram showing the position for each of the blocks included in an image and a coding order (or a decoding order). FIG. 7B is an example of a coded stream in which the moving information (MV1, MV2, MV3, and MV4) related to blocks each having one of the decoding orders 1 to 4 (BLK1, BLK2, BLK3, and BLK4) are successively located. FIG. 8 is an operational flow diagram which focuses on parts involved in memory transfer in the image decoding method according to the present embodiment.

The blocks having decoding orders from 1 to 4 shown in FIG. 7A are spatially arranged in a z order, and the blocks having decoding orders from 5 to 8 are also arranged in the z order on the right side of the blocks. In the case where motion compensation is performed on the block of the decoding order 2 (BlkCurr), a possibility of batching memory transfer of the reference pixel data of the block (BlkCurr) and the reference pixel data of the block adjacent to the right side (BlkRight) will be described.

For example, if a coded stream shown in FIG. 7B is input into the image decoding apparatus 200, there is a case where a batch transfer can be performed on the reference pixel data of the blocks (BLK1 to BLK4) as similarly to the conventional decoding apparatus.

Furthermore, if the image decoding apparatus 200 according to an aspect of the present invention is used, the image decoding apparatus 200 can perform extension transfer (batch transfer) of the reference pixel data of the blocks having decoding orders from 1 to 4 and the block having the decoding order 5 by assuming that the motion information of the sub-block on the left side of the block (BlkRight) having the decoding order 5 located adjacent to the right side of the block BlkCurr having the decoding order 2 is equivalent to the motion information (MV2) of the current block (here, the block having the decoding order 2). With reference to FIG. 8, an operation of the image decoding apparatus 200 will be described in detail.

First, the extension transfer control unit 134 checks whether or not the prediction pixel data of the current block (BlkCurr) exists in the temporary memory 135 before decoding the current block (BlkCurr) (S100).

If there is no prediction pixel data of the current block (BlkCurr) (No in S100), the extension transfer control unit 134 determines whether or not the extension transfer of the current block as well as the reference pixel data of the adjacent block adjacent to the current block is performed from the frame memory 102 to the local reference memory 123 (S111). It should be noted that details of Step S111 will be described later with reference to FIG. 9.

For example, in Step S111, in the case where it is determined that extension transfer is performed also on the reference pixel data of the sub-block on the left side of the adjacent block (BlkRight) (Yes in S111), the extended reference pixel data (motion compensation reference pixel MCpel1) is transferred from the frame memory 102 to the local reference memory 123 (S115).

Next, the motion compensation unit 105 obtains the motion compensation reference pixel MCpel1 transferred to the local reference memory 123, and applies a motion compensation interpolation filter based on the information about a fractional precision of the motion vector MV2 of the current block (BlkCurr), and generates the prediction pixel data of the current block (BlkCurr) (It is also referred to as motion compensation pixel data. The same shall apply hereinafter) and the prediction pixel data of the sub-block on the left side of the adjacent block (BlkRight).

Next, the motion compensation unit 105 outputs the motion compensation pixel data MCPel2 related to the current block (BlkCurr) as the motion compensation image related to the current block (BlkCurr) to the addition unit 107 via the selector 136 (S117). Moreover, the motion compensation unit 105 stores, in the temporary memory 135, the motion compensation pixel data MCPelExt2 related to the sub-block on the left side of the adjacent block (BlkRight) (S118).

Meanwhile, in Step S111, in the case where it is determined that the extension transfer is not performed (No in S111), the extension transfer control unit 134 transfers only the reference pixel data of the current block (BlkCurr) from the frame memory 102 to the local reference memory 123 (S112). Then, the motion compensation unit 105 applies the motion compensation interpolation filter to the reference pixel data stored in the local reference memory 123 based on the fractional precision information of the motion vector, and generates the prediction pixel data of the current block (BlkCurr) (S113). The motion compensation unit 105 outputs the motion compensated pixel MCPel 2 related to the current block (BlkCurr) to the selector 136. The selector 136 outputs, to the addition unit 107, the motion compensation pixel data MCPel2 obtained from the motion compensation unit 105 as the motion compensation pixel MCPelCur related to the current block (BlkCurr).

Next, a decoding process of the block (BlkRight) having the decoding order 5 after the end of the decoding of the blocks having the decoding orders 3 and 4 will be described. Since the block (BlkRight) is coded on a sub-block by sub-block basis, the decoding is also performed on a sub-block by sub-block basis.

First, the extension transfer control unit 134 checks whether or not the prediction pixel data of the sub-block on the left side exists in the temporary memory 135 (S100). The prediction pixel data, as described above, is generated when the prediction pixel data of the block (BlkCurr) is generated, and is stored in the temporary memory 135.

Next, the selector 136 checks whether or not the prediction pixel data stored in the temporary memory 135 has a successful look-ahead acquisition (S101). In other words, the prediction pixel data is generated at the time of the past transfer by assuming that the reference picture number RefNo and the motion vector MV are identical to those of the block having the decoding order 2, and therefore the data may not be correct. In other words, in the case where the reference picture number RefNo and the motion vector MV of the sub-block are identical to the reference number RefNo and the motion vector MV of the block (BlkCurr), look-ahead acquisition is successful (True in S101). Meanwhile, in the case where one of the reference picture number RefNo and motion vector MV for the sub-block do not match one of them for the block, look-ahead acquisition ends in failure (False in S101).

In the case where look-ahead acquisition ends in failure (False in S101), the prediction pixel data stored in the temporary memory 135 is erased (S104) and the process is shifted to the previously described Step S111. In this case, since the extension transfer is not performed (No in S111), only the reference pixel data of the sub-block is transferred (S112), the prediction pixel data of the sub-block is generated (S113), and the generated prediction pixel data is output to the addition unit 107 via the selector 136.

Meanwhile, in the case where look-ahead acquisition is successful (True in S101), the selector 136 reads out the prediction pixel data stored in the temporary memory 135, outputs the data to the addition unit 107 as the motion compensation pixel data MCPel4 (S102), and erases the prediction pixel data from the temporary memory 135 (S103).

In this way, even in the case where the small motion compensation blocks are obtained by division and are coded, it is possible to perform the batch transfer along with the reference pixel data of the spatially adjacent block and memory transfer efficiency can be increased. It should be noted that in the case where small motion compensation blocks are not obtained by division, the speculative acquisition rather leads to degradation in memory efficiency. Therefore, the image decoding apparatus 200 may calculate a probability that a motion compensation block in the latest decoded block is divided and may determine in the determination on the extension transfer (S111) based on the probability.

Alternately, the probability is not independently measured, rather than that, the extension transfer determination (S111) may be dynamically controlled based on the probability indicating the presence or absence of the difference information in a probability model related to the difference information of the motion vector.

Alternately, the motion vector of the non-decoded adjacent block is not assumed, rather than that, information about the motion vector of the coded stream is decoded in advance. After determination of the information of the motion vector, the determination may be made on the memory batch transfer of the current block and the adjacent block.

Figure 9:
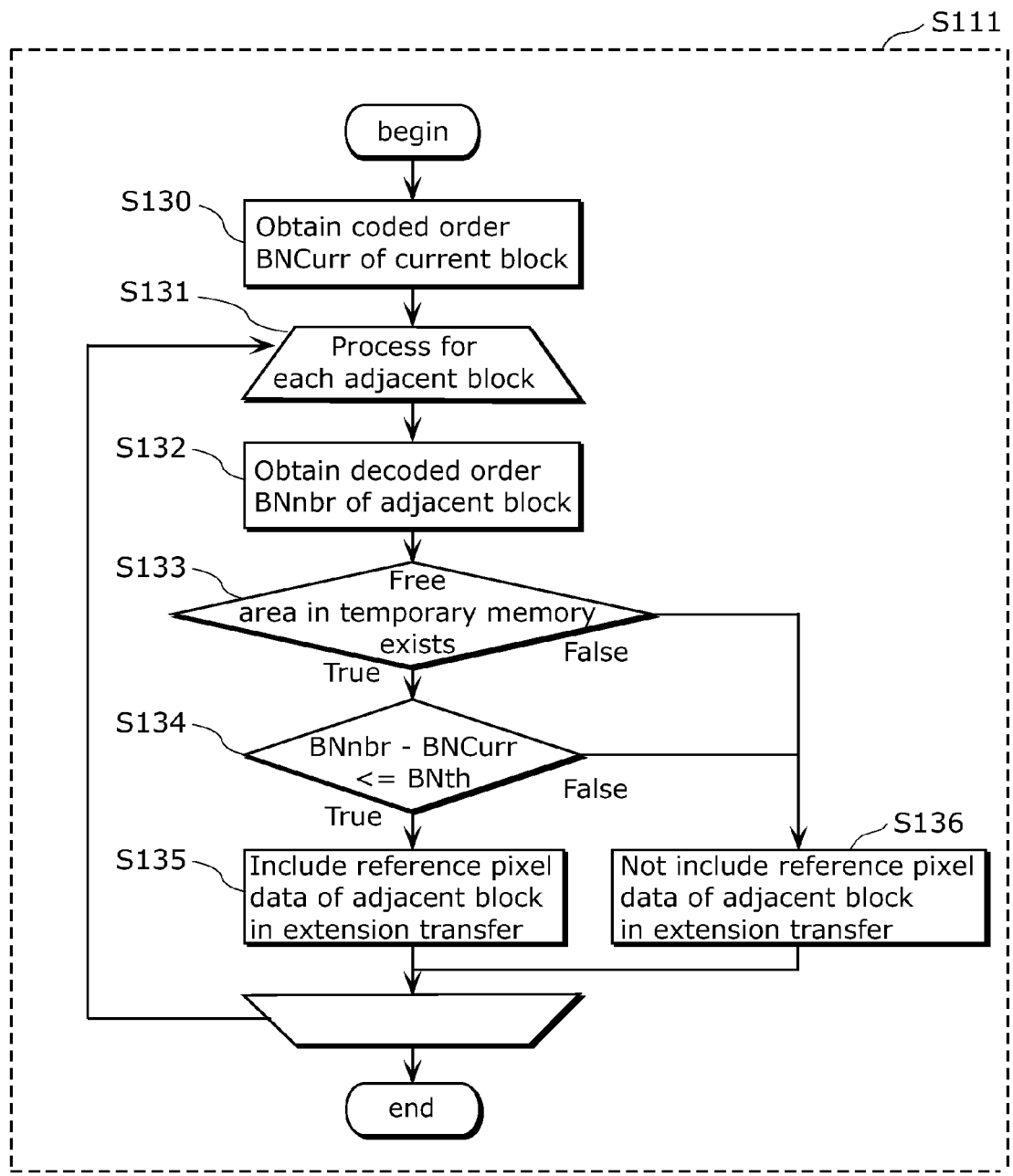
FIG. 9 is a diagram showing details of extension transfer determination in FIG. 8 (S111).

With reference to FIG. 9, details of the extension transfer determination (S111) in FIG. 8 will be described.

First, a decoding order BNCurr of the current block is calculated (S130). In the above example, the decoding order of the current block (BlkCurr) is a decoding order BNCurr=2.

Next, a process on a block-by-block basis is performed on the block which is adjacent to the current block (BlkCurr) and has yet to be decoded (S131).

First, the extension transfer control unit 134 calculates a decoding order BNnbr of the non-decoded adjacent block (S132). In the example shown in FIG. 7A, the decoding order BNnbr=4 is calculated in the first cycle and the decoding order BNnbr=5 us calculated in the second cycle.

Next, the extension transfer control unit 134 checks whether or not a free area exists in the temporary memory 135 (S133). More specifically, the extension transfer control unit 134 determines the presence or absence of a free area for storing the prediction pixel data of the adjacent block.

In the case where the free area is present (True in S133), the extension transfer control unit 134 determines whether or not the difference between the decoding order BNnbr of the adjacent block and the decoding order of the current block BnCurr is less than or equal to a threshold BNth (S133).

In the case where the difference is less than or equal to the threshold (True in S134), the extension transfer control unit 134 includes the reference pixel data of the adjacent block in the extension transfer target (S135). For example, if the threshold BNth equals 3, the reference pixel data of the adjacent blocks having the decoding orders 4 and 5 are included in the extension transfer target.

Here, extension transfer may be performed on all the reference pixel data satisfying the above conditions (S133 and S134). In the case where there are adjacent blocks satisfying the conditions, extension transfer may be performed only on the reference pixel data on one of the blocks. For example, only the reference pixel data of the adjacent block in which the decoding order is the closest to that of the current block may be included in the extension transfer target.

Moreover, in addition to the above described conditions, it may be determined whether or not the adjacent block is coded on a sub-block by sub-block basis, and only the reference pixel data of the sub-block adjacent to the current block may be included in the extension transfer target. Alternately, only the reference pixel data of the block having a motion vector identical to the motion vector of the current block may be included in the extension transfer target. Furthermore, an arbitrary combination of the conditions is acceptable.

Meanwhile, in Step S133, in the case where the difference in decoding order is greater than the threshold BNth (False in S134), the extension transfer control unit 134 does not include the reference pixel data of the adjacent block in the extension transfer target (S136).

Moreover, in Step S133, also in the case where there is no free area in the temporary memory 135 (False in S133), the extension transfer control unit 134 does not include the prediction pixel data of the adjacent block in the extension transfer target (S136). It should be noted that Step S132 may be performed only in the case where the determination on the free area in Step S133 is true. Alternately, a repetition process on the adjacent block (S131) may be performed only in the case where there is a free area in the temporary memory 135.

It should be noted that the threshold BNth may be defined by a profile or a level of a standard. Moreover, the size of the temporary memory 135 may be defined by a profile or a level of a standard.

Figure 10:
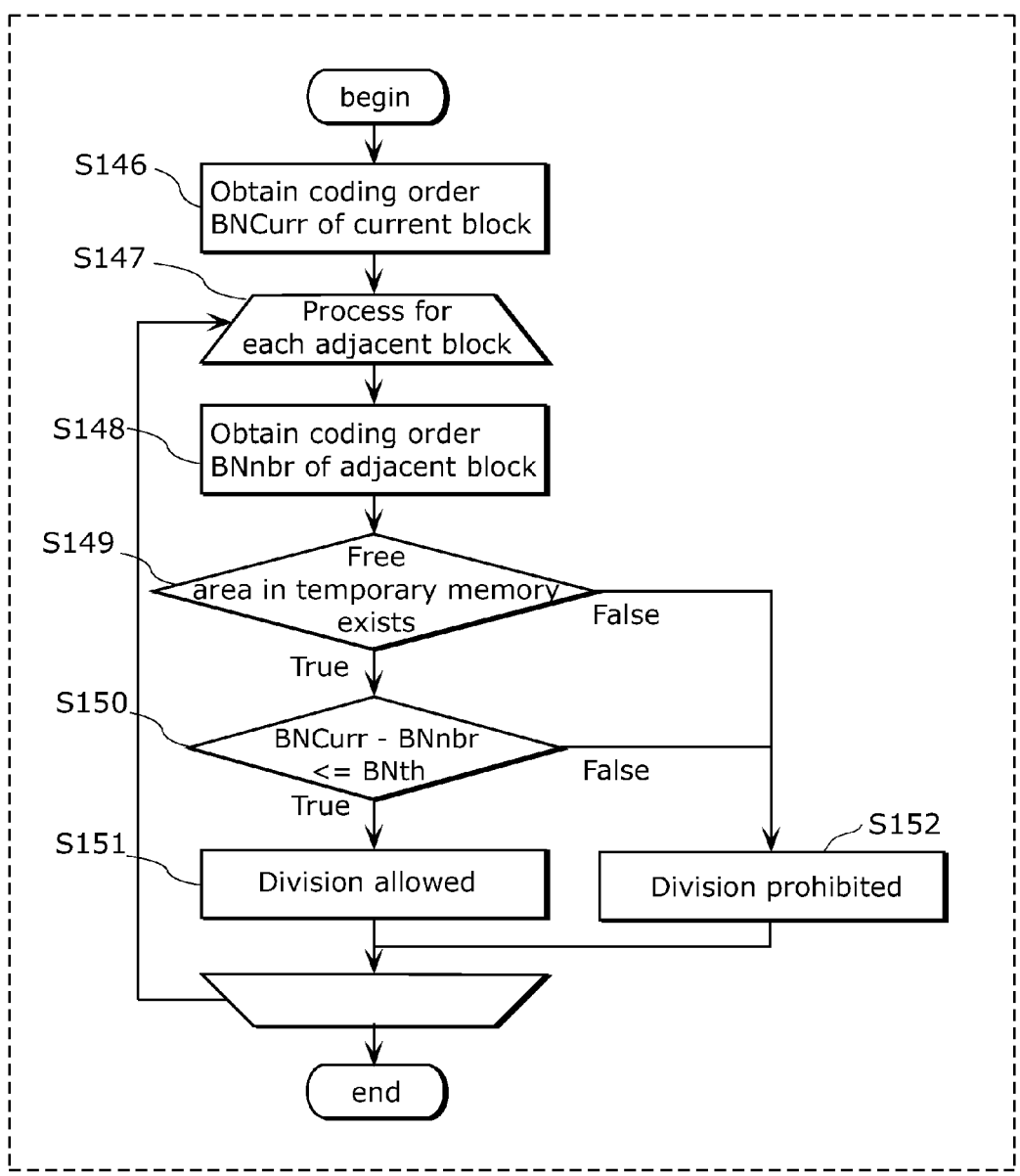
FIG. 10 is an operational flow diagram of the image coding apparatus according to the present embodiment.

For the compatibility of the image decoding apparatus 200, the operations of the image decoding apparatus 200 shown in FIGS. 8 and 9 are defined as a standard, and an operational flow of the image coding apparatus 100 which performs coding for satisfying the standard will be described with reference to FIGS. 7A and 10

First, the image coding apparatus 100 calculates a coding order BNCurr of the current block (S146). For example, when the block (BlkRight) shown in FIG. 8 is determined as the current block, a coding order BNCurr equals 5.

Next, the image coding apparatus 100 performs a process, on an adjacent block by adjacent block basis, on an adjacent block which is an already coded block and is spatially adjacent to the current block (S147).

First, the image coding apparatus 100 calculates a coding order BNnbr of the adjacent block (S148). In an example shown in FIG. 7A, a coding order BNnbr=2 is calculated. Next, the image coding apparatus 100 checks whether or not a free area exists in the temporary memory 135 (S149).

In the case where a free area exists (True in S149), the image coding apparatus 100 determines whether or nor the difference between the coding order BnCurr of the current block and the coding order BNnbr of the adjacent block is less than or equal to the threshold BNth (S150).

In the case where the difference is less than or equal to the threshold (True in S150), the image coding apparatus 100 allows coding of the current block on a sub-block by sub-block basis (S151). Moreover, although the illustration is omitted, in the case where the current block is coded on a sub-block by sub-block basis, the motion compensation control unit 110 performs motion compensation on the sub-block on the side in contact with the adjacent block among a plurality of sub-blocks included in the current block with the use of the motion vector which is the same as the motion vector of the adjacent block. In this case, the motion information (MV5) shown in FIG. 7B stores the motion information about the sub-block on the right side of the current block (BlkRight), and the motion information of the left side of the sub-block is omitted.

Meanwhile, in Step S150, in the case where the difference is greater than the threshold (False in S150), the image coding apparatus 100 does not allow coding of the current block on a sub-block by sub-block basis (S152). Moreover, in Step S149, in the case where no free area exists in the temporary memory 135 (False in S149), the image coding apparatus 100 does not allow coding of the current block on a sub-block by sub-block basis (S152).

Moreover, the extension transfer determination in the image decoding method according to the present invention as described in FIG. 8 is a definitive example. As described above, control may be performed on the batch transfer with higher accuracy, based on the probability that the division of the motion compensation block (and the difference in MV) occurs. However, a frequency of the division of the motion compensation block varies depending on the features of video to be coded and a bit rate.

In the case where the probability is low, a further increase in the memory transfer efficiency may be tried by frequently performing a batch transfer. In other words, the image coding apparatus 100 may calculate the probability and includes the threshold BNth in a bit stream or define a profile and a level to notify the image decoding apparatus 200 and to maximize the memory transfer efficiency in the image decoding apparatus 200.

Figure 11:
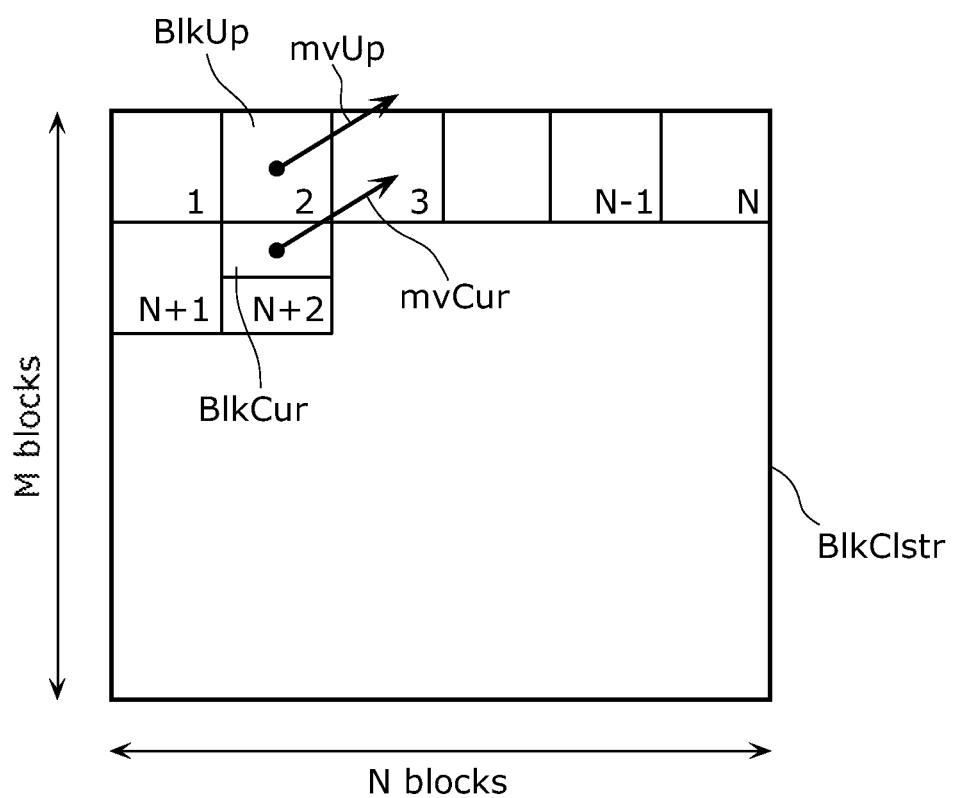
FIG. 11 is a conceptual diagram of operations of a decoding method according to the present invention.

Moreover, there is a case where coding of a small unit obtained by division of a picture is performed instead of coding of the whole picture in a raster order. In H. 264, a slice is used as this type of unit. Here, by generalizing, picture division unit BlkClstr of vertical width M blocks and horizontal width N blocks and is considered. A description will be made with reference to FIG. 11.

Assuming that the coding order of the block is a raster order in the division unit, in the case where the vertical width N is significantly large, the size of a temporary memory necessary for the batch transfer of vertically adjacent blocks is significantly large. Alternately, since the memory included in the image decoding apparatus 200 is finite, a frequency in which the bundle transfer can be performed is decreased.

Therefore, in the case where the horizontal width N is more than or equal to a certain level, the image coding apparatus 100 according to the present embodiment divides the block into a plurality of motion compensation blocks and does not perform coding such that MV is different from the motion vectors of the vertically adjacent blocks.

In this way, the image decoding apparatus 200 according to the present embodiment can increase the memory transfer efficiency between the adjacent blocks, and by defining an example of an operation, a coded stream generated by the coding apparatus and coding method according to the present embodiment can maintain compatibility of the decoding apparatus.

Embodiment 2

The processing described in each of embodiments can be simply implemented in an independent computer system, by recording, in a recording medium, a program for implementing the configurations of the moving picture coding method and the moving picture decoding method described in each of embodiments. The recording media may be any recording media as long as the program can be recorded, such as a magnetic disk, an optical disk, a magnetic optical disk, an IC card, and a semiconductor memory.

Hereinafter, the applications to the moving picture coding method (image coding method) and the moving picture decoding method (image decoding method) described in each of embodiments and systems using thereof will be described.

Figure 12:
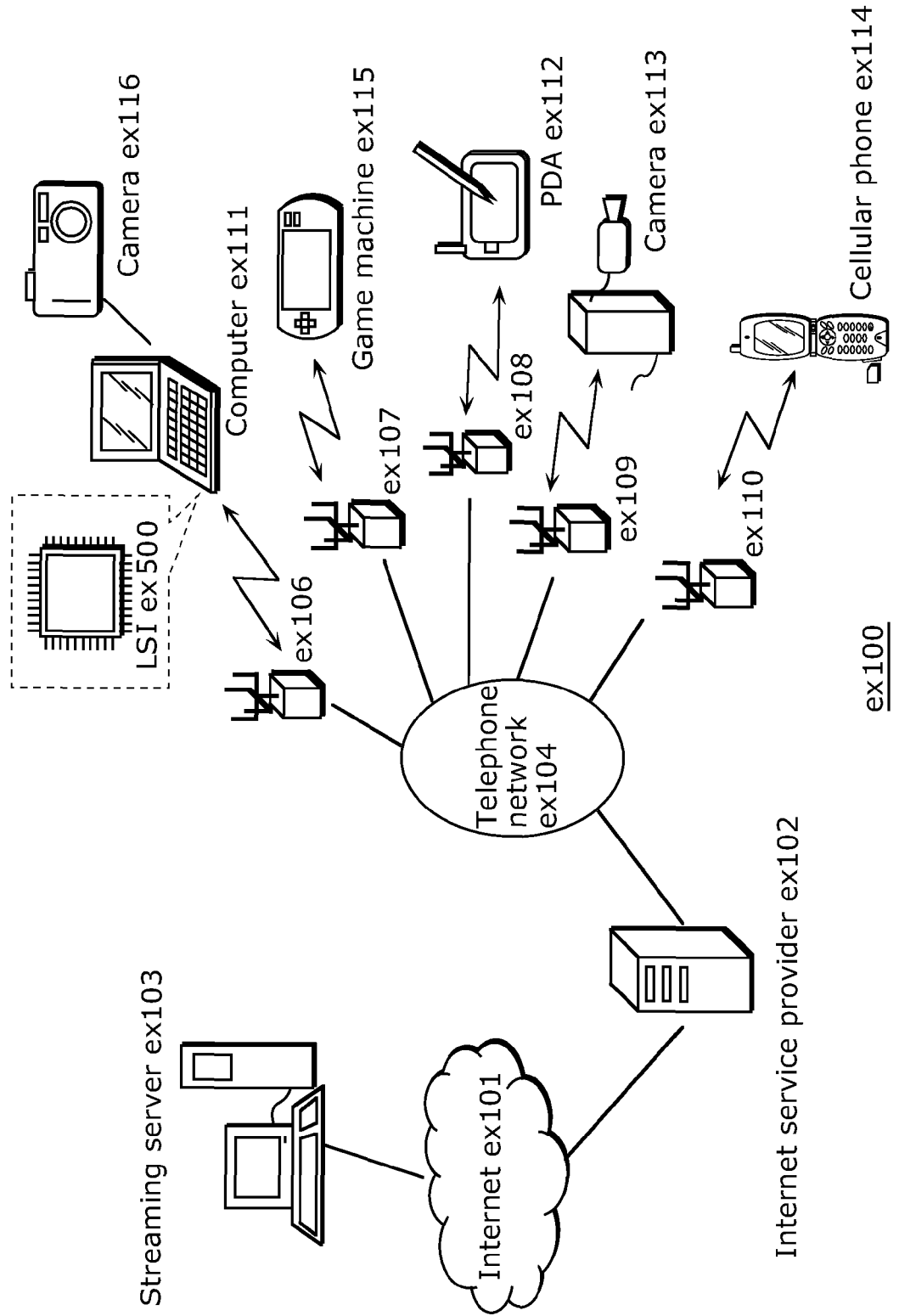
FIG. 12 is an overall configuration of a content providing system which implements content distribution services.

FIG. 12 illustrates an overall configuration of a content providing system ex100 for implementing content distribution services. The area for providing communication services is divided into cells of desired size, and base stations ex106, ex107, ex108, ex109, and ex110 which are fixed wireless stations are placed in each of the cells.

The content providing system ex100 is connected to devices, such as a computer ex111, a personal digital assistant (PDA) ex112, a camera ex113, a cellular phone ex114 and a game machine ex115, via the Internet ex101, an Internet service provider ex102, a telephone network ex104, as well as the base stations ex106 to ex110, respectively.

However, the configuration of the content providing system ex100 is not limited to the configuration shown in FIG. 12, and a combination in which any of the elements are connected is acceptable. In addition, each device may be directly connected to the telephone network ex104, rather than via the base stations ex106 to ex110 which are the fixed wireless stations. Furthermore, the devices may be interconnected to each other via a short distance wireless communication and others.

The camera ex113, such as a digital video camera, is capable of capturing video. A camera ex116, such as a digital camera, is capable of capturing both still images and video. Furthermore, the cellular phone ex114 may be the one that meets any of the standards such as Global System for Mobile Communications (GSM), Code Division Multiple Access (CDMA), Wideband-Code Division Multiple Access (W-CDMA), Long Term Evolution (LTE), and High Speed Packet Access (HSPA). Alternatively, the cellular phone ex114 may be a Personal Handyphone System (PHS).

In the content providing system ex100, a streaming server ex103 is connected to the camera ex113 and others via the telephone network ex104 and the base station ex109, which enables distribution of images of a live show and others. In such a distribution, a content (for example, video of a music live show) captured by the user using the camera ex113 is coded as described above in each of embodiments (i.e., the camera functions as the image coding apparatus according to an aspect of the present invention), and the coded content is transmitted to the streaming server ex103. On the other hand, the streaming server ex103 carries out stream distribution of the transmitted content data to the clients upon their requests. The clients include the computer ex111, the PDA ex112, the camera ex113, the cellular phone ex114, and the game machine ex115 that are capable of decoding the above-mentioned coded data. Each of the devices that have received the distributed data decodes and reproduces the coded data.

The captured data may be coded by the camera ex113 or the streaming server ex103 that transmits the data, or the coding processes may be shared between the camera ex113 and the streaming server ex103. Similarly, the distributed data may be decoded by the clients or the streaming server ex103, or the decoding processes may be shared between the clients and the streaming server ex103. Furthermore, the data of the still images and video captured by not only the camera ex113 but also the camera ex116 may be transmitted to the streaming server ex103 through the computer ex111. The coding processes may be performed by the camera ex116, the computer ex111, or the streaming server ex103, or shared among them.

Furthermore, the coding and decoding processes may be performed by an LSI ex500 generally included in each of the computer ex111 and the devices. The LSI ex500 may be configured of a single chip or a plurality of chips. Software for coding and decoding video may be integrated into some type of a recording medium (such as a CD-ROM, a flexible disk, and a hard disk) that is readable by the computer ex111 and others, and the coding and decoding processes may be performed using the software. Furthermore, when the cellular phone ex114 is equipped with a camera, the video data obtained by the camera may be transmitted. The video data is data coded by the LSI ex500 included in the cellular phone ex114.

Furthermore, the streaming server ex103 may be composed of servers and computers, and may decentralize data and process the decentralized data, record, or distribute data.

As described above, the clients may receive and reproduce the coded data in the content providing system ex100. In other words, the clients can receive and decode information transmitted by the user, and reproduce the decoded data in real time in the content providing system ex100, so that the user who does not have any particular right and equipment can implement personal broadcasting.

Figure 13:
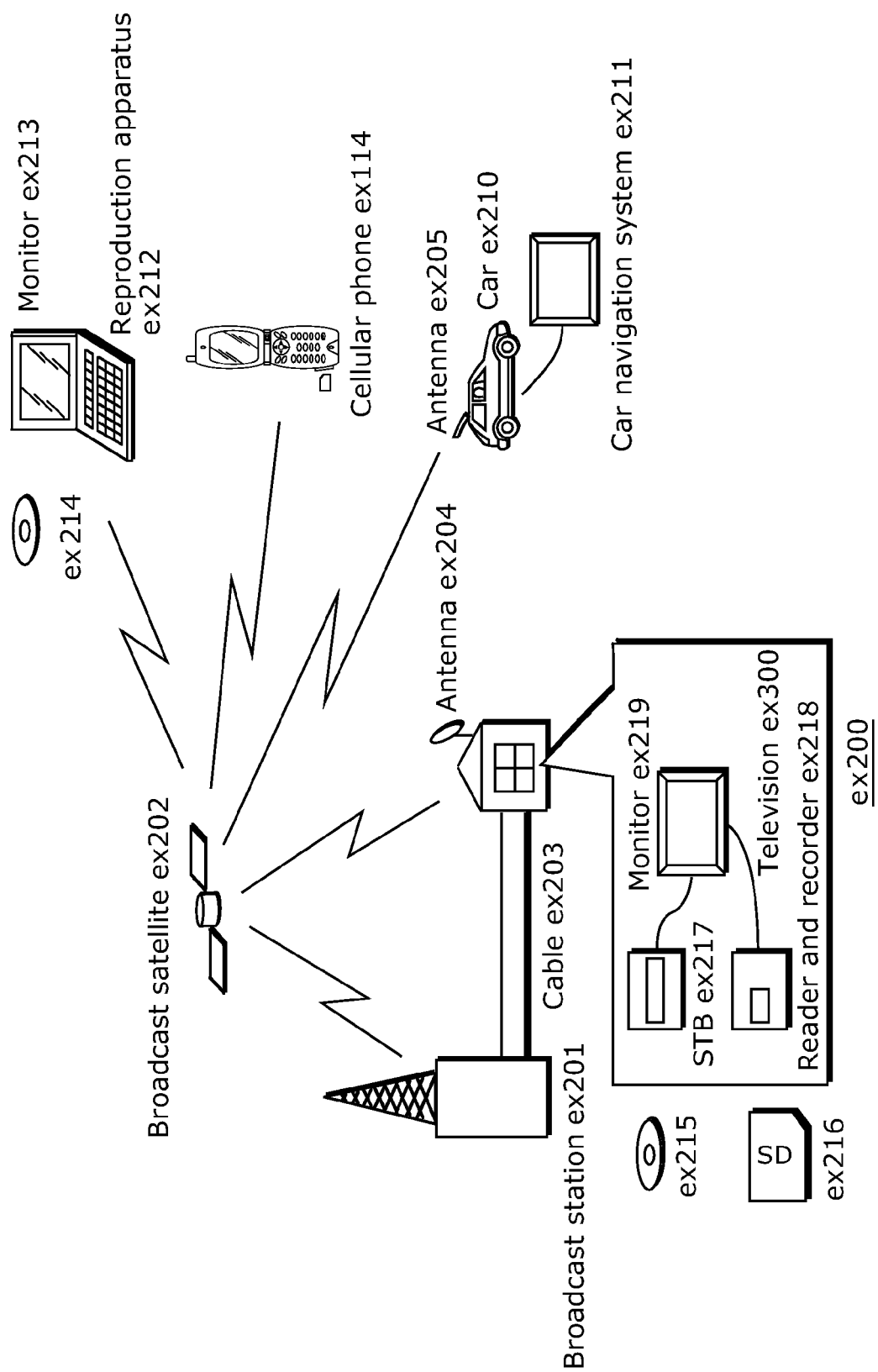
FIG. 13 is an overall configuration of a digital broadcasting system.

Aside from the example of the content providing system ex100, at least one of the moving picture coding apparatus and the moving picture decoding apparatus described in each of embodiments may be implemented in a digital broadcasting system ex200 illustrated in FIG. 13. More specifically, a broadcast station ex201 communicates or transmits, via radio waves to a broadcast satellite ex202, multiplexed data obtained by multiplexing audio data and others onto video data. The video data is data coded by the moving picture coding method described in each of embodiments. Upon receipt of the multiplexed data, the broadcast satellite ex202 transmits radio waves for broadcasting. Then, a home-use antenna ex204 with a satellite broadcast reception function receives the radio waves. Next, a device such as a television (receiver) ex300 and a set top box (STB) ex217 decodes the received multiplexed data, and reproduces the decoded data.

Furthermore, a reader/recorder ex218 (i) reads and decodes the multiplexed data recorded on a recording medium ex215, such as a DVD and a BD, or (ii) codes video signals in the recording medium ex215, and in some cases, writes data obtained by multiplexing an audio signal on the coded data. The reader/recorder ex218 can include the moving picture decoding apparatus or the moving picture coding apparatus as shown in each of embodiments. In this case, the reproduced video signals are displayed on the monitor ex219, and can be reproduced by another device or system using the recording medium ex215 on which the multiplexed data is recorded. It is also possible to implement the moving picture decoding apparatus in the set top box ex217 connected to the cable ex203 for a cable television or to the antenna ex204 for satellite and/or terrestrial broadcasting, so as to display the video signals on the monitor ex219 of the television ex300. The moving picture decoding apparatus may be implemented not in the set top box but in the television ex300.

Figure 14:
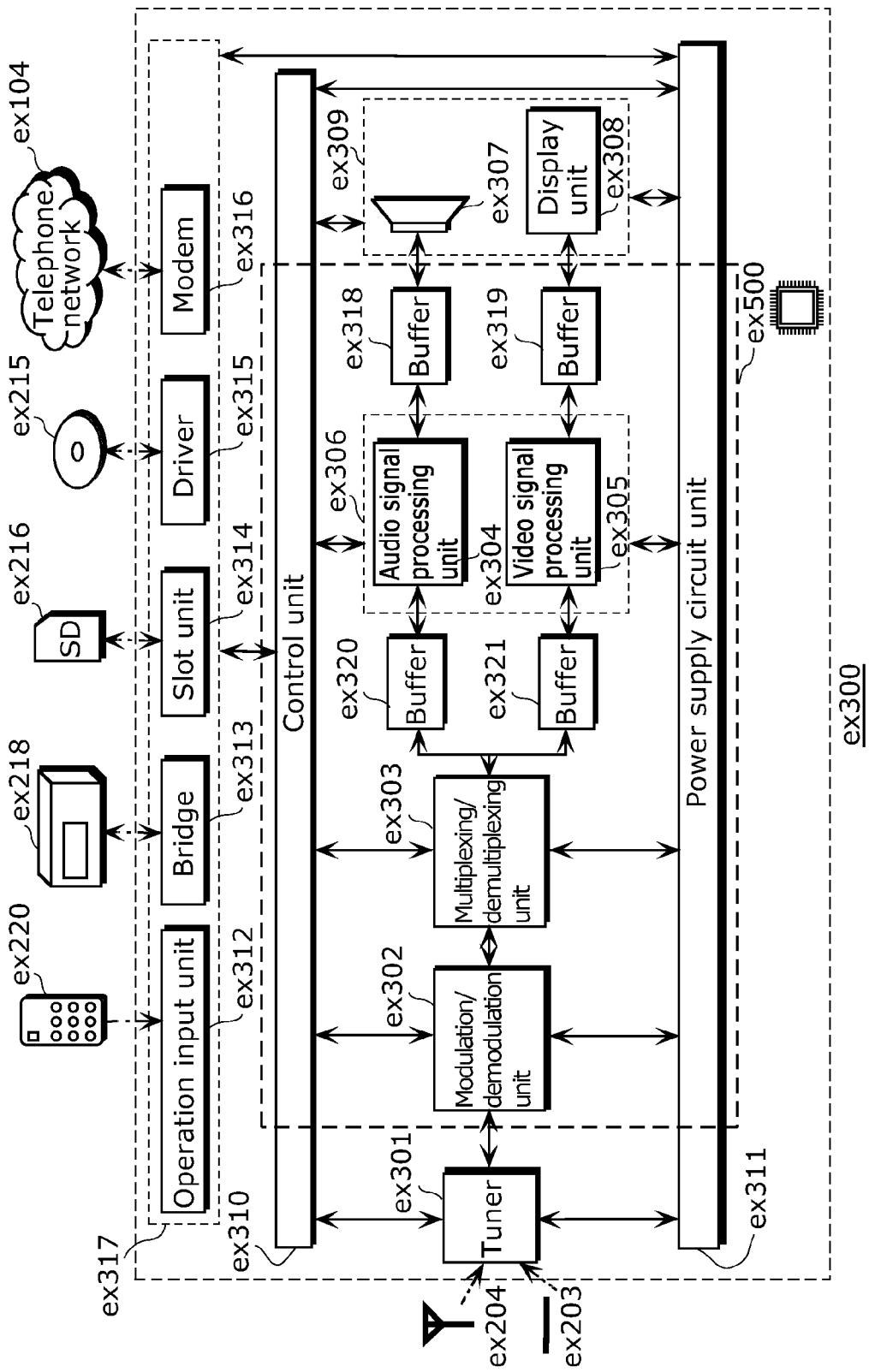
FIG. 14 is a block diagram showing an example of a configuration of a television.

FIG. 14 illustrates the television (receiver) ex300 that uses the moving picture coding method and the moving picture decoding method described in each of embodiments. The television ex300 includes: a tuner ex301 that obtains or provides multiplexed data obtained by multiplexing audio data onto video data, through the antenna ex204 or the cable ex203, etc. that receives a broadcast; a modulation/demodulation unit ex302 that demodulates the received multiplexed data or modulates data into multiplexed data to be supplied outside; and a multiplexing/demultiplexing unit ex303 that demultiplexes the modulated multiplexed data into video data and audio data, or multiplexes video data and audio data coded by a signal processing unit ex306 into data.

The television ex300 further includes: a signal processing unit ex306 including an audio signal processing unit ex304 and a video signal processing unit ex305 that decode audio data and video data and code audio data and video data, respectively; and an output unit ex309 including a speaker ex307 that provides the decoded audio signal, and a display unit ex308 that displays the decoded video signal, such as a display. Furthermore, the television ex300 includes an interface unit ex317 including an operation input unit ex312 that receives an input of a user operation. Furthermore, the television ex300 includes a control unit ex310 that controls overall each constituent element of the television ex300, and a power supply circuit unit ex311 that supplies power to each of the elements. Other than the operation input unit ex312, the interface unit ex317 may include: a bridge ex313 that is connected to an external device, such as the reader/recorder ex218; a slot unit ex314 for enabling attachment of the recording medium ex216, such as an SD card; a driver ex315 to be connected to an external recording medium, such as a hard disk; and a modem ex316 to be connected to a telephone network. Here, the recording medium ex216 can electrically record information using a non-volatile/volatile semiconductor memory element for storage. The constituent elements of the television ex300 are connected to each other through a synchronous bus.

First, the configuration in which the television ex300 decodes multiplexed data obtained from outside through the antenna ex204 and others and reproduces the decoded data will be described. In the television ex300, upon a user operation through a remote controller ex220 and others, the multiplexing/demultiplexing unit ex303 demultiplexes the multiplexed data demodulated by the modulation/demodulation unit ex302, under control of the control unit ex310 including a CPU. Furthermore, the audio signal processing unit ex304 decodes the demultiplexed audio data, and the video signal processing unit ex305 decodes the demultiplexed video data, using the decoding method described in each of embodiments, in the television ex300. The output unit ex309 provides the decoded video signal and audio signal outside, respectively. When the output unit ex309 provides the video signal and the audio signal, the signals may be temporarily stored in buffers ex318 and ex319, and others so that the signals are reproduced in synchronization with each other. Furthermore, the television ex300 may read multiplexed data not through a broadcast and others but from the recording media ex215 and ex216, such as a magnetic disk, an optical disk, and a SD card. Next, a configuration in which the television ex300 codes an audio signal and a video signal, and transmits the data outside or writes the data on a recording medium will be described. In the television ex300, upon a user operation through the remote controller ex220 and others, the audio signal processing unit ex304 codes an audio signal, and the video signal processing unit ex305 codes a video signal, under control of the control unit ex310 using the coding method described in each of embodiments. The multiplexing/demultiplexing unit ex303 multiplexes the coded video signal and audio signal, and provides the resulting signal outside. When the multiplexing/demultiplexing unit ex303 multiplexes the video signal and the audio signal, the signals may be temporarily stored in the buffers ex320 and ex321, and others so that the signals are reproduced in synchronization with each other. Here, the buffers ex318, ex319, ex320, and ex321 may be plural as illustrated, or at least one buffer may be shared in the television ex300. Furthermore, data may be stored in a buffer so that the system overflow and underflow may be avoided between the modulation/demodulation unit ex302 and the multiplexing/demultiplexing unit ex303, for example.

Furthermore, the television ex300 may include a configuration for receiving an AV input from a microphone or a camera other than the configuration for obtaining audio and video data from a broadcast or a recording medium, and may code the obtained data. Although the television ex300 can code, multiplex, and provide outside data in the description, it may be capable of only receiving, decoding, and providing outside data but not the coding, multiplexing, and providing outside data.

Furthermore, when the reader/recorder ex218 reads or writes multiplexed data from or on a recording medium, one of the television ex300 and the reader/recorder ex218 may decode or code the multiplexed data, and the television ex300 and the reader/recorder ex218 may share the decoding or coding.

Figure 15:
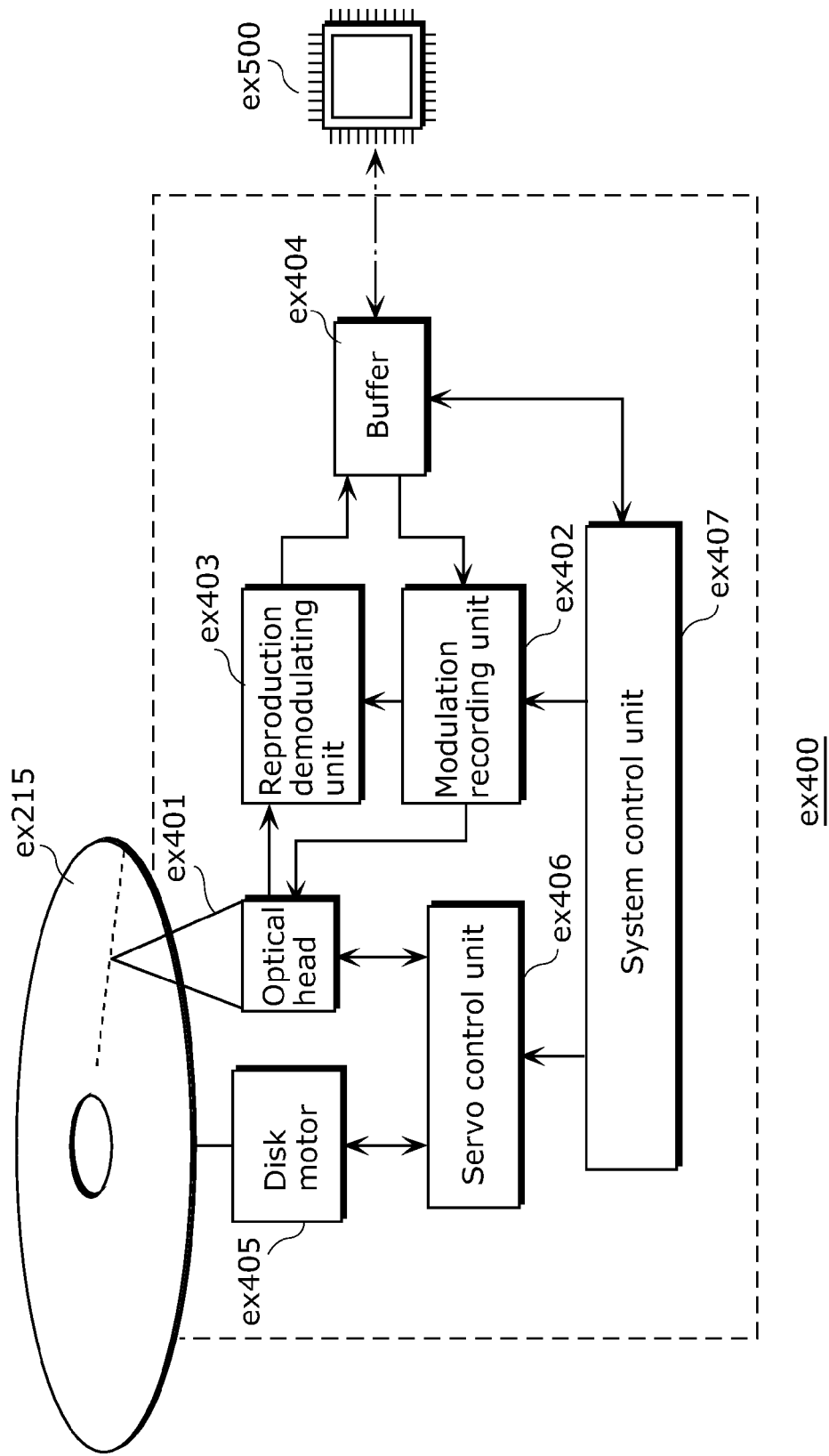
FIG. 15 is a block diagram illustrating an example of a configuration of an information reproducing/recording unit that reads and writes information from and on a recording medium that is an optical disk.

As an example, FIG. 15 illustrates a configuration of an information reproducing/recording unit ex400 when data is read or written from or on an optical disk. The information reproducing/recording unit ex400 includes constituent elements ex401, ex402, ex403, ex404, ex405, ex406, and ex407 to be described hereinafter. The optical head ex401 irradiates a laser spot in a recording surface of the recording medium ex215 that is an optical disk to write information, and detects reflected light from the recording surface of the recording medium ex215 to read the information. The modulation recording unit ex402 electrically drives a semiconductor laser included in the optical head ex401, and modulates the laser light according to recorded data. The reproduction demodulating unit ex403 amplifies a reproduction signal obtained by electrically detecting the reflected light from the recording surface using a photo detector included in the optical head ex401, and demodulates the reproduction signal by separating a signal component recorded on the recording medium ex215 to reproduce the necessary information. The buffer ex404 temporarily holds the information to be recorded on the recording medium ex215 and the information reproduced from the recording medium ex215. The disk motor ex405 rotates the recording medium ex215. The servo control unit ex406 moves the optical head ex401 to a predetermined information track while controlling the rotation drive of the disk motor ex405 so as to follow the laser spot. The system control unit ex407 controls overall the information reproducing/recording unit ex400. The reading and writing processes can be implemented by the system control unit ex407 using various information stored in the buffer ex404 and generating and adding new information as necessary, and by the modulation recording unit ex402, the reproduction demodulating unit ex403, and the servo control unit ex406 that record and reproduce information through the optical head ex401 while being operated in a coordinated manner. The system control unit ex407 includes, for example, a microprocessor, and executes processing by causing a computer to execute a program for read and write.

Although the optical head ex401 irradiates a laser spot in the description, it may perform high-density recording using near field light.

Figure 16:
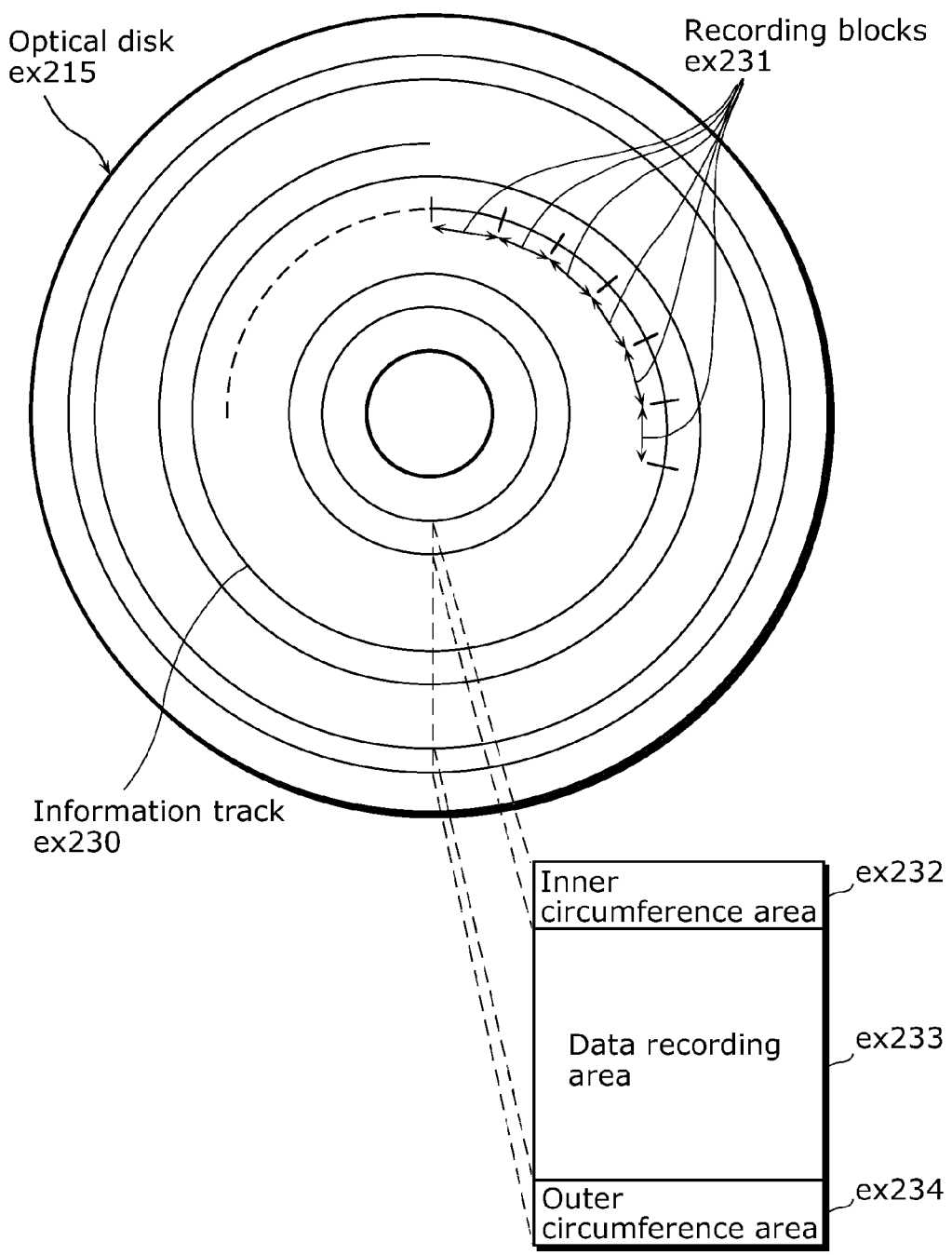
FIG. 16 is a diagram showing a configuration of a recording medium that is an optical disk.

FIG. 16 illustrates the recording medium ex215 that is the optical disk. On the recording surface of the recording medium ex215, guide grooves are spirally formed, and an information track ex230 records, in advance, address information indicating an absolute position on the disk according to change in a shape of the guide grooves. The address information includes information for determining positions of recording blocks ex231 that are a unit for recording data. Reproducing the information track ex230 and reading the address information in an apparatus that records and reproduces data can lead to determination of the positions of the recording blocks. Furthermore, the recording medium ex215 includes a data recording area ex233, an inner circumference area ex232, and an outer circumference area ex234. The data recording area ex233 is an area for use in recording the user data. The inner circumference area ex232 and the outer circumference area ex234 that are inside and outside of the data recording area ex233, respectively are for specific use except for recording the user data. The information reproducing/recording unit 400 reads and writes coded audio, coded video data, or multiplexed data obtained by multiplexing the coded audio and video data, from and on the data recording area ex233 of the recording medium ex215.

Although an optical disk having a layer, such as a DVD and a BD is described as an example in the description, the optical disk is not limited to such, and may be an optical disk having a multilayer structure and capable of being recorded on a part other than the surface. Furthermore, the optical disk may have a structure for multidimensional recording/reproduction, such as recording of information using light of colors with different wavelengths in the same portion of the optical disk and for recording information having different layers from various angles.

Furthermore, a car ex210 having an antenna ex205 can receive data from the satellite ex202 and others, and reproduce video on a display device such as a car navigation system ex211 set in the car ex210, in the digital broadcasting system ex200. Here, a configuration of the car navigation system ex211 will be a configuration, for example, including a GPS receiving unit from the configuration illustrated in FIG. 14. The same will be true for the configuration of the computer ex111, the cellular phone ex114, and others. Furthermore, similarly to the television ex300, a terminal such as the cellular phone ex114 probably have 3 types of implementation configurations including not only (i) a transmitting and receiving terminal including both a coding apparatus and a decoding apparatus, but also (ii) a transmitting terminal including only a coding apparatus and (iii) a receiving terminal including only a decoding apparatus. Although the digital broadcasting system ex200 receives and transmits the multiplexed data obtained by multiplexing audio data onto video data in the description, the multiplexed data may be data obtained by multiplexing not audio data but character data related to video onto video data, and may be not multiplexed data but video data itself.

As such, the moving picture coding method and the moving picture decoding method in each of embodiments can be used in any of the devices and systems described. Thus, the advantages described in each of embodiments can be obtained.

Furthermore, the present invention is not limited to embodiments, and various modifications and revisions are possible without departing from the scope of the present invention.

Embodiment 3

Video data can be generated by switching, as necessary, between (i) the moving picture coding method or the moving picture coding apparatus shown in each of embodiments and (ii) a moving picture coding method or a moving picture coding apparatus in conformity with a different standard, such as MPEG-2, MPEG-4 AVC, and VC-1.

Here, when a plurality of video data that conforms to the different standards is generated and is then decoded, the decoding methods need to be selected to conform to the different standards. However, since to which standard each of the plurality of the video data to be decoded conform cannot be detected, there is a problem that an appropriate decoding method cannot be selected.

In order to solve the problem, multiplexed data obtained by multiplexing audio data and others onto video data has a structure including identification information indicating to which standard the video data conforms. The specific structure of the multiplexed data including the video data generated in the moving picture coding method and by the moving picture coding apparatus shown in each of embodiments will be hereinafter described. The multiplexed data is a digital stream in the MPEG-2 Transport Stream format.

Figure 17:
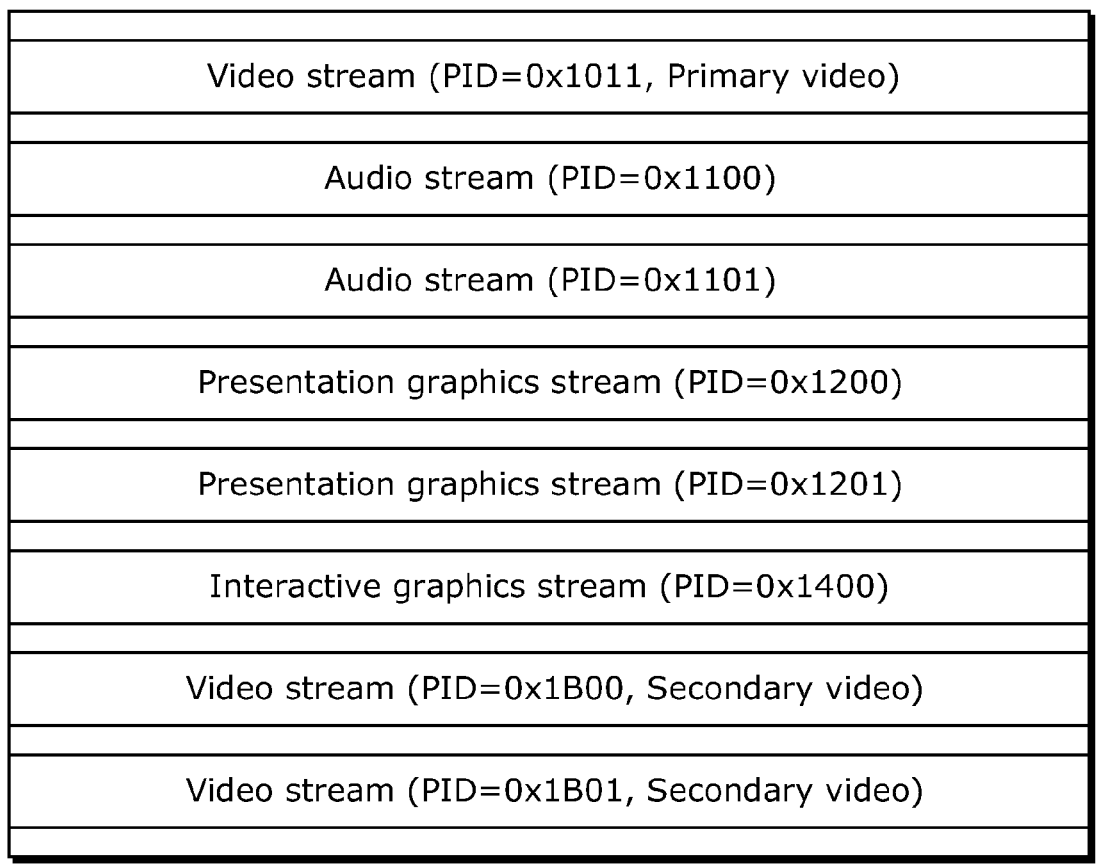
FIG. 17 is a diagram showing a structure of multiplex data.

FIG. 17 illustrates a structure of the multiplexed data. As illustrated in FIG. 17, the multiplexed data can be obtained by multiplexing at least one of a video stream, an audio stream, a presentation graphics stream (PG), and an interactive graphics stream. The video stream represents primary video and secondary video of a movie, the audio stream (IG) represents a primary audio part and a secondary audio part to be mixed with the primary audio part, and the presentation graphics stream represents subtitles of the movie. Here, the primary video is normal video to be displayed on a screen, and the secondary video is video to be displayed on a smaller window in the primary video. Furthermore, the interactive graphics stream represents an interactive screen to be generated by arranging the GUI components on a screen. The video stream is coded in the moving picture coding method or by the moving picture coding apparatus shown in each of embodiments, or in a moving picture coding method or by a moving picture coding apparatus in conformity with a conventional standard, such as MPEG-2, MPEG-4 AVC, and VC-1. The audio stream is coded in accordance with a standard, such as Dolby-AC-3, Dolby Digital Plus, MLP, DTS, DTS-HD, and linear PCM.

Each stream included in the multiplexed data is identified by PID. For example, 0x1011 is allocated to the video stream to be used for video of a movie, 0x1100 to 0x111F are allocated to the audio streams, 0x1200 to 0x121F are allocated to the presentation graphics streams, 0x1400 to 0x141F are allocated to the interactive graphics streams, 0x1B00 to 0x1B1F are allocated to the video streams to be used for secondary video of the movie, and 0x1A00 to 0x1A1F are allocated to the audio streams to be used for the secondary audio to be mixed with the primary audio.

Figure 18:
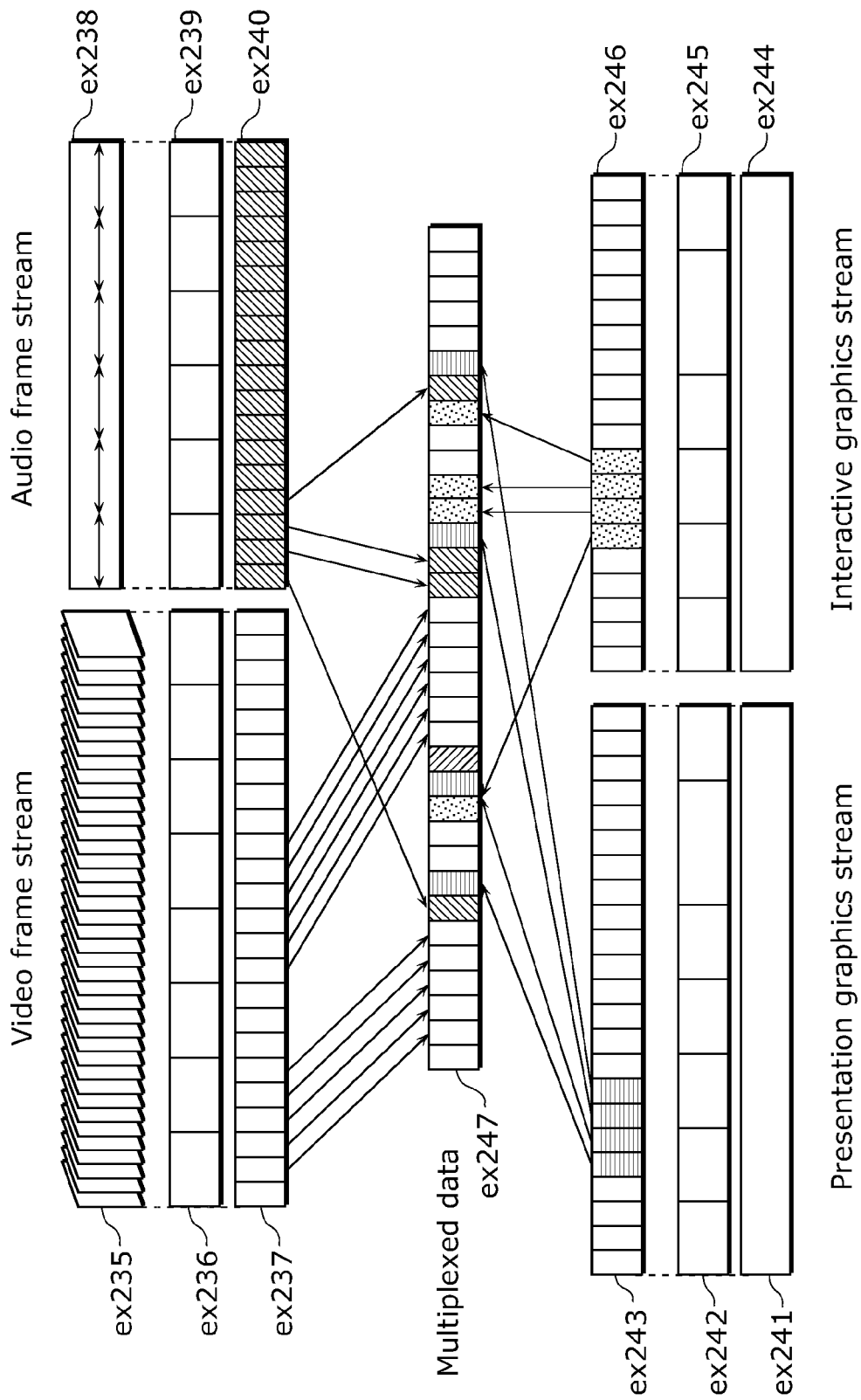
FIG. 18 is a diagram showing how to multiplex each stream in multiplex data.

FIG. 18 schematically illustrates how data is multiplexed. First, a video stream ex235 composed of video frames and an audio stream ex238 composed of audio frames are transformed into a stream of PES packets ex236 and a stream of PES packets ex239, and further into TS packets ex237 and TS packets ex240, respectively. Similarly, data of a presentation graphics stream ex241 and data of an interactive graphics stream ex244 are transformed into a stream of PES packets ex242 and a stream of PES packets ex245, and further into TS packets ex243 and TS packets ex246, respectively. These TS packets are multiplexed into a stream to obtain multiplexed data ex247.

Figure 19:
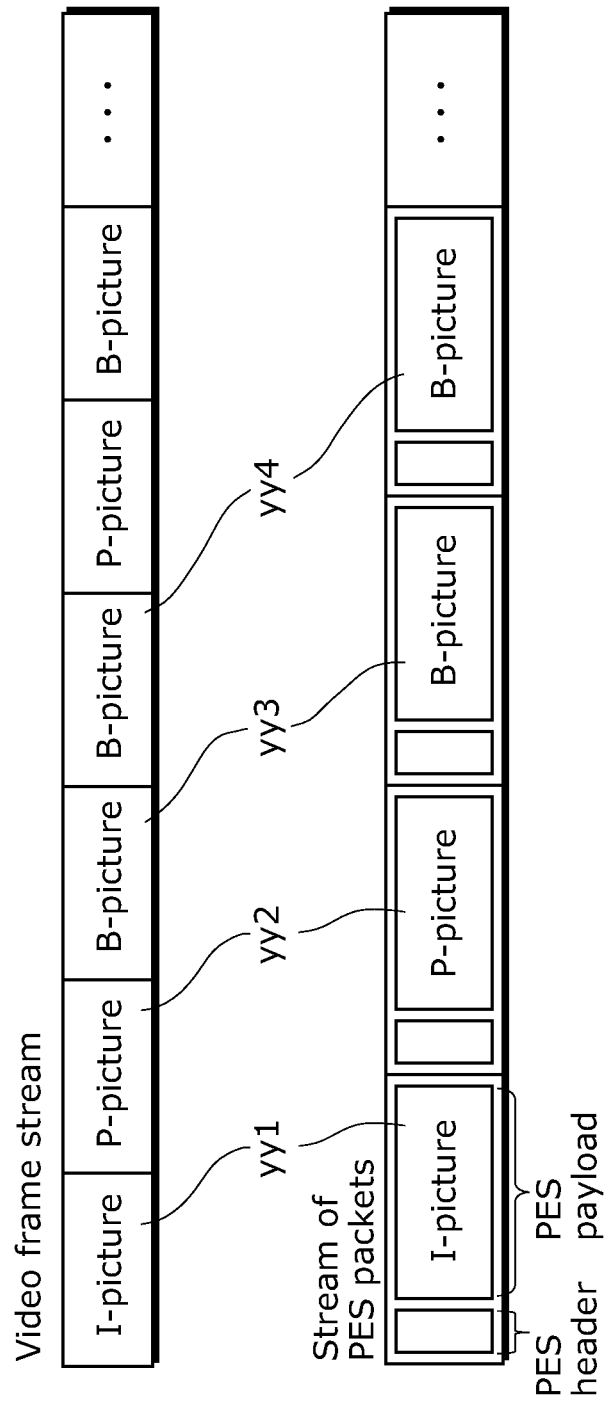
FIG. 19 is a diagram showing how a video stream is stored in a stream of PES packets in more detail.

FIG. 19 illustrates how a video stream is stored in a stream of PES packets in more detail. The first bar in FIG. 17 shows a video frame stream in a video stream. The second bar shows the stream of PES packets. As indicated by arrows denoted as yy1, yy2, yy3, and yy4 in FIG. 17, the video stream is divided into pictures as I pictures, B pictures, and P pictures each of which is a video presentation unit, and the pictures are stored in a payload of each of the PES packets. Each of the PES packets has a PES header, and the PES header stores a Presentation Time-Stamp (PTS) indicating a display time of the picture, and a Decoding Time-Stamp (DTS) indicating a decoding time of the picture.

FIG. 20 illustrates a format of TS packets to be finally written on the multiplexed data. Each of the TS packets is a 188-byte fixed length packet including a 4-byte TS header having information, such as a PID for identifying a stream and a 184-byte TS payload for storing data. The PES packets are divided, and stored in the TS payloads, respectively. When a BD ROM is used, each of the TS packets is given a 4-byte TP_Extra_Header, thus resulting in 192-byte source packets. The source packets are written on the multiplexed data. The TP_Extra_Header stores information such as an Arrival_Time_Stamp (ATS). The ATS shows a transfer start time at which each of the TS packets is to be transferred to a PID filter. The source packets are arranged in the multiplexed data as shown at the bottom of FIG. 20. The numbers incrementing from the head of the multiplexed data are called source packet numbers (SPNs).

Each of the TS packets included in the multiplexed data includes not only streams of audio, video, subtitles and others, but also a Program Association Table (PAT), a Program Map Table (PMT), and a Program Clock Reference (PCR). The PAT shows what a PID in a PMT used in the multiplexed data indicates, and a PID of the PAT itself is registered as zero. The PMT stores PIDs of the streams of video, audio, subtitles and others included in the multiplexed data, and attribute information of the streams corresponding to the PIDs. The PMT also has various descriptors relating to the multiplexed data. The descriptors have information such as copy control information showing whether copying of the multiplexed data is permitted or not. The PCR stores STC time information corresponding to an ATS showing when the PCR packet is transferred to a decoder, in order to achieve synchronization between an Arrival Time Clock (ATC) that is a time axis of ATSs, and an System Time Clock (STC) that is a time axis of PTSs and DTSs.

FIG. 21 illustrates the data structure of the PMT in detail. A PMT header is disposed at the top of the PMT. The PMT header describes the length of data included in the PMT and others. A plurality of descriptors relating to the multiplexed data is disposed after the PMT header. Information such as the copy control information is described in the descriptors. After the descriptors, a plurality of pieces of stream information relating to the streams included in the multiplexed data is disposed. Each piece of stream information includes stream descriptors each describing information, such as a stream type for identifying a compression codec of a stream, a stream PID, and stream attribute information (such as a frame rate or an aspect ratio). The stream descriptors are equal in number to the number of streams in the multiplexed data.

When the multiplexed data is recorded on a recording medium and others, it is recorded together with multiplexed data information files.

Figure 22:
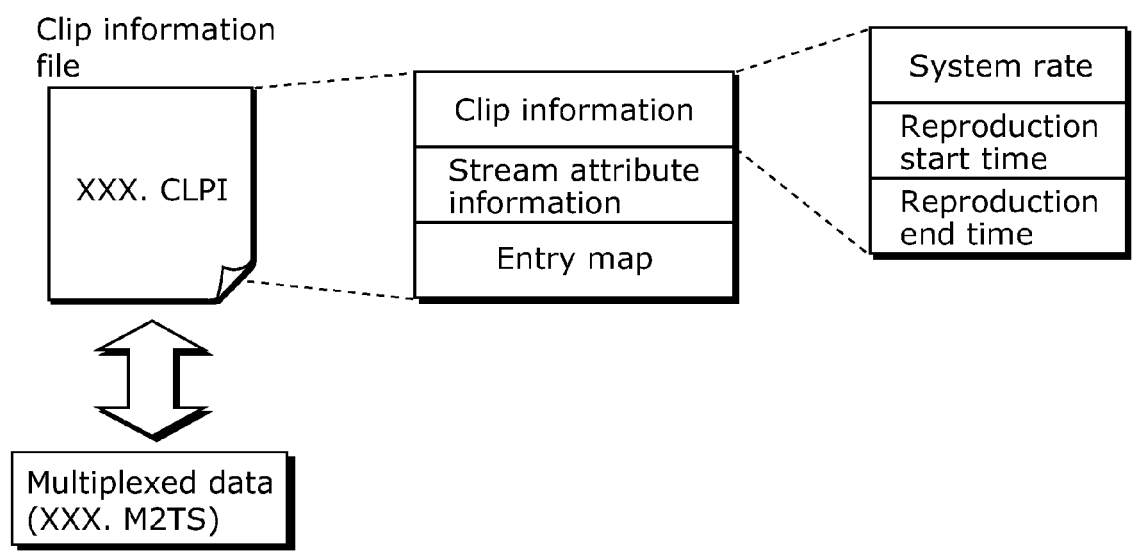
FIG. 22 is a diagram showing an internal structure of multiplexed data information.

Each of the multiplexed data information files is management information of the multiplexed data as shown in FIG. 22. The multiplexed data information files are in one to one correspondence with the multiplexed data, and each of the files includes multiplexed data information, stream attribute information, and an entry map.

As illustrated in FIG. 22, the multiplexed data information includes a system rate, a reproduction start time, and a reproduction end time. The system rate indicates the maximum transfer rate at which a system target decoder to be described later transfers the multiplexed data to a PID filter. The intervals of the ATSs included in the multiplexed data are set to not higher than a system rate. The reproduction start time indicates a PTS in a video frame at the head of the multiplexed data. An interval of one frame is added to a PTS in a video frame at the end of the multiplexed data, and the PTS is set to the reproduction end time.

Figure 23:
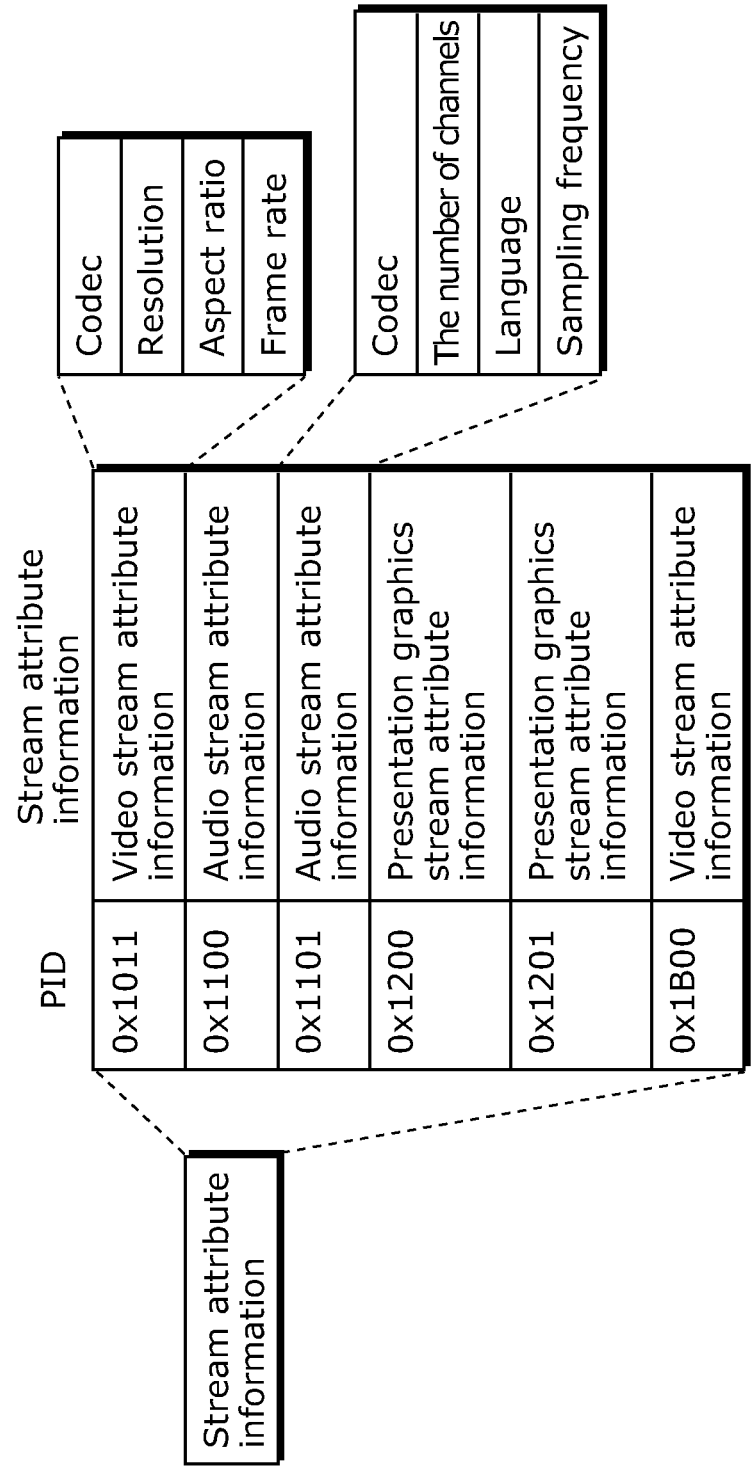
FIG. 23 is a diagram showing an internal structure of stream attribute information.

As shown in FIG. 23, a piece of attribute information is registered in the stream attribute information, for each PID of each stream included in the multiplexed data. Each piece of attribute information has different information depending on whether the corresponding stream is a video stream, an audio stream, a presentation graphics stream, or an interactive graphics stream. Each piece of video stream attribute information carries information including what kind of compression codec is used for compressing the video stream, and the resolution, aspect ratio and frame rate of the pieces of picture data that is included in the video stream. Each piece of audio stream attribute information carries information including what kind of compression codec is used for compressing the audio stream, how many channels are included in the audio stream, which language the audio stream supports, and how high the sampling frequency is. The video stream attribute information and the audio stream attribute information are used for initialization of a decoder before the player plays back the information.

In the present embodiment, the multiplexed data to be used is of a stream type included in the PMT. Furthermore, when the multiplexed data is recorded on a recording medium, the video stream attribute information included in the multiplexed data information is used. More specifically, the moving picture coding method or the moving picture coding apparatus described in each of embodiments includes a step or a unit for allocating unique information indicating video data generated by the moving picture coding method or the moving picture coding apparatus in each of embodiments, to the stream type included in the PMT or the video stream attribute information. With the configuration, the video data generated by the moving picture coding method or the moving picture coding apparatus described in each of embodiments can be distinguished from video data that conforms to another standard.

Figure 24:
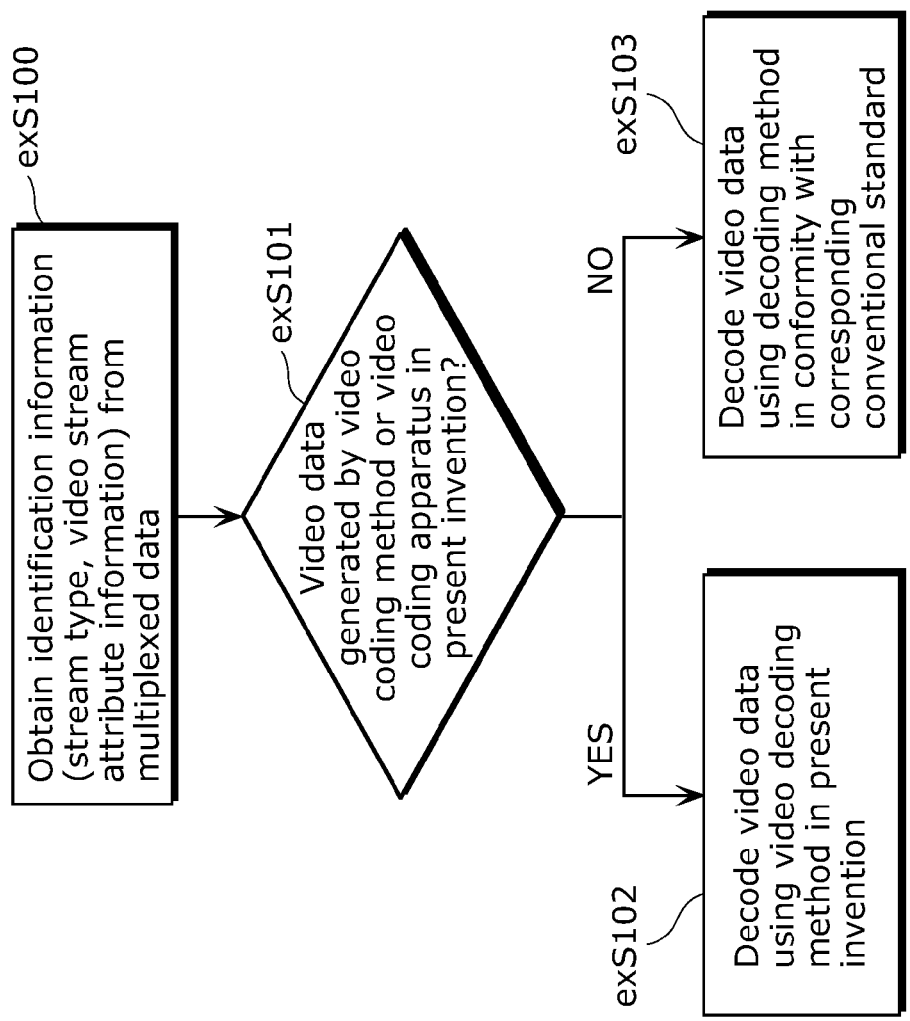
FIG. 24 is a diagram showing steps for identifying video data.

Furthermore, FIG. 24 illustrates steps of the moving picture decoding method according to the present embodiment. In Step exS100, the stream type included in the PMT or the video stream attribute information included in the multiplexed data information is obtained from the multiplexed data. Next, in Step exS101, it is determined whether or not the stream type or the video stream attribute information indicates that the multiplexed data is generated by the moving picture coding method or the moving picture coding apparatus in each of embodiments. When it is determined that the stream type or the video stream attribute information indicates that the multiplexed data is generated by the moving picture coding method or the moving picture coding apparatus in each of embodiments, in Step exS102, decoding is performed by the moving picture decoding method in each of embodiments. Furthermore, when the stream type or the video stream attribute information indicates conformance to the conventional standards, such as MPEG-2, MPEG-4 AVC, and VC-1, in Step exS103, decoding is performed by a moving picture decoding method in conformity with the conventional standards.

As such, allocating a new unique value to the stream type or the video stream attribute information enables determination whether or not the moving picture decoding method or the moving picture decoding apparatus that is described in each of embodiments can perform decoding. Even when multiplexed data that conforms to a different standard is input, an appropriate decoding method or apparatus can be selected. Thus, it becomes possible to decode information without any error. Furthermore, the moving picture coding method or apparatus, or the moving picture decoding method or apparatus in the present embodiment can be used in the devices and systems described above.

Embodiment 4

Figure 25:
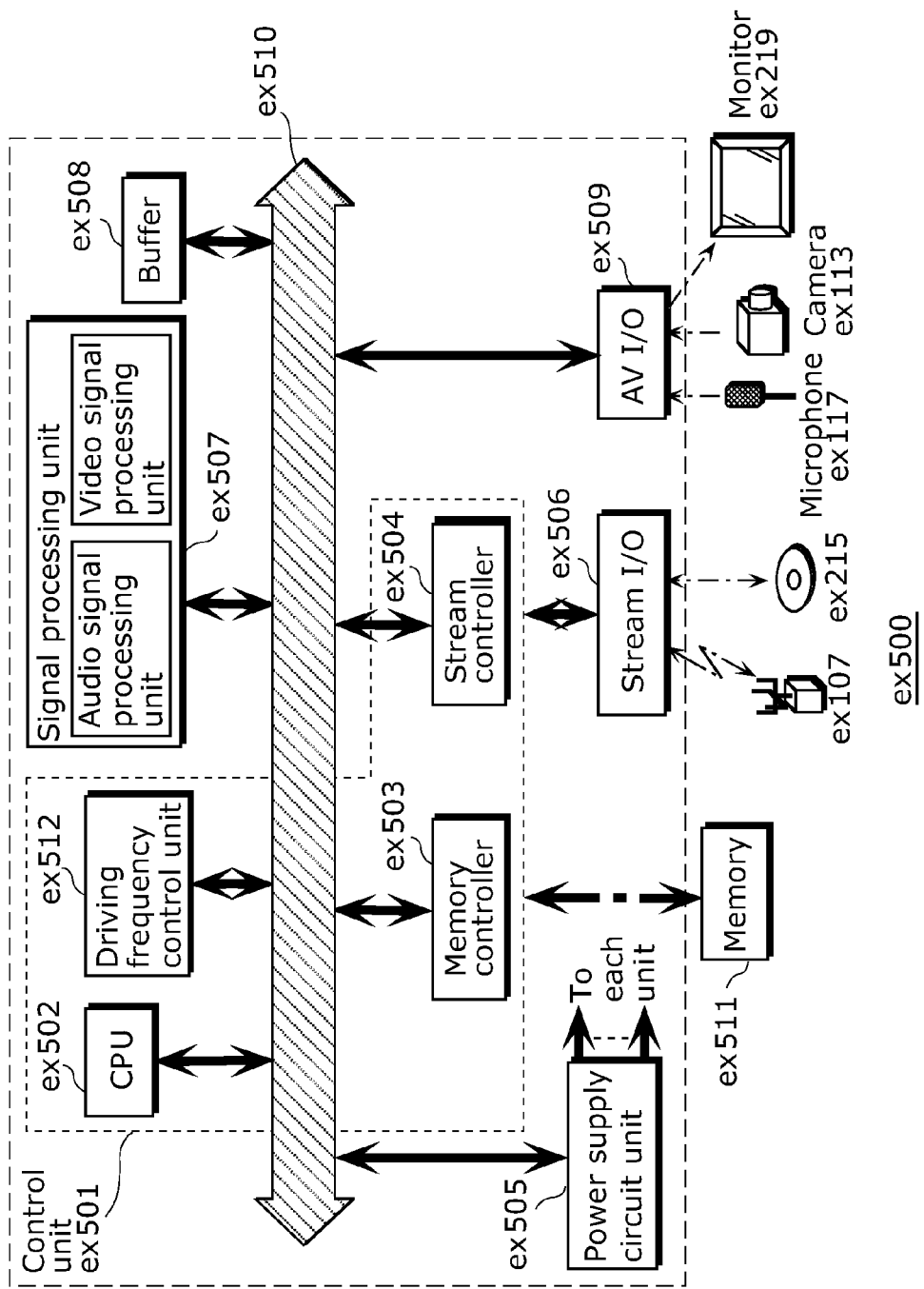
FIG. 25 is a block diagram showing an example of a configuration of an integrated circuit for implementing the moving picture coding method and the moving picture decoding method according to each of the embodiments.

Each of the moving picture coding method, the moving picture coding apparatus, the moving picture decoding method, and the moving picture decoding apparatus in each of embodiments is typically achieved in the form of an integrated circuit or a Large Scale Integrated (LSI) circuit. As an example of the LSI, FIG. 25 illustrates a configuration of the LSI ex500 that is made into one chip. The LSI ex500 includes elements ex501, ex502, ex503, ex504, ex505, ex506, ex507, ex508, and ex509 to be described below, and the elements are connected to each other through a bus ex510. The power supply circuit unit ex505 is activated by supplying each of the elements with power when the power supply circuit unit ex505 is turned on.

For example, when coding is performed, the LSI ex500 receives an AV signal from a microphone ex117, a camera ex113, and others through an AV IO ex509 under control of a control unit ex501 including a CPU ex502, a memory controller ex503, a stream controller ex504, and a driving frequency control unit ex512. The received AV signal is temporarily stored in an external memory ex511, such as an SDRAM. Under control of the control unit ex501, the stored data is segmented into data portions according to the processing amount and speed to be transmitted to a signal processing unit ex507. Then, the signal processing unit ex507 codes an audio signal and/or a video signal. Here, the coding of the video signal is the coding described in each of embodiments. Furthermore, the signal processing unit ex507 sometimes multiplexes the coded audio data and the coded video data, and a stream IO ex506 provides the multiplexed data outside. The provided multiplexed data is transmitted to the base station ex107, or written on the recording medium ex215. When data sets are multiplexed, the data should be temporarily stored in the buffer ex508 so that the data sets are synchronized with each other.

Although the memory ex511 is an element outside the LSI ex500, it may be included in the LSI ex500. The buffer ex508 is not limited to one buffer, but may be composed of buffers. Furthermore, the LSI ex500 may be made into one chip or a plurality of chips.

Furthermore, although the control unit ex501 includes the CPU ex502, the memory controller ex503, the stream controller ex504, the driving frequency control unit ex512, the configuration of the control unit ex501 is not limited to such. For example, the signal processing unit ex507 may further include a CPU. Inclusion of another CPU in the signal processing unit ex507 can improve the processing speed. Furthermore, as another example, the CPU ex502 may serve as or be a part of the signal processing unit ex507, and, for example, may include an audio signal processing unit. In such a case, the control unit ex501 includes the signal processing unit ex507 or the CPU ex502 including a part of the signal processing unit ex507.

The name used here is LSI, but it may also be called IC, system LSI, super LSI, or ultra LSI depending on the degree of integration.

Moreover, ways to achieve integration are not limited to the LSI, and a special circuit or a general purpose processor and so forth can also achieve the integration. Field Programmable Gate Array (FPGA) that can be programmed after manufacturing LSIs or a reconfigurable processor that allows re-configuration of the connection or configuration of an LSI can be used for the same purpose.

In the future, with advancement in semiconductor technology, a brand-new technology may replace LSI. The functional blocks can be integrated using such a technology. The possibility is that the present invention is applied to biotechnology.

Embodiment 5

When video data generated in the moving picture coding method or by the moving picture coding apparatus described in each of embodiments is decoded, compared to when video data that conforms to a conventional standard, such as MPEG-2, MPEG-4 AVC, and VC-1 is decoded, the processing amount probably increases. Thus, the LSI ex500 needs to be set to a driving frequency higher than that of the CPU ex502 to be used when video data in conformity with the conventional standard is decoded. However, when the driving frequency is set higher, there is a problem that the power consumption increases.

Figure 26:
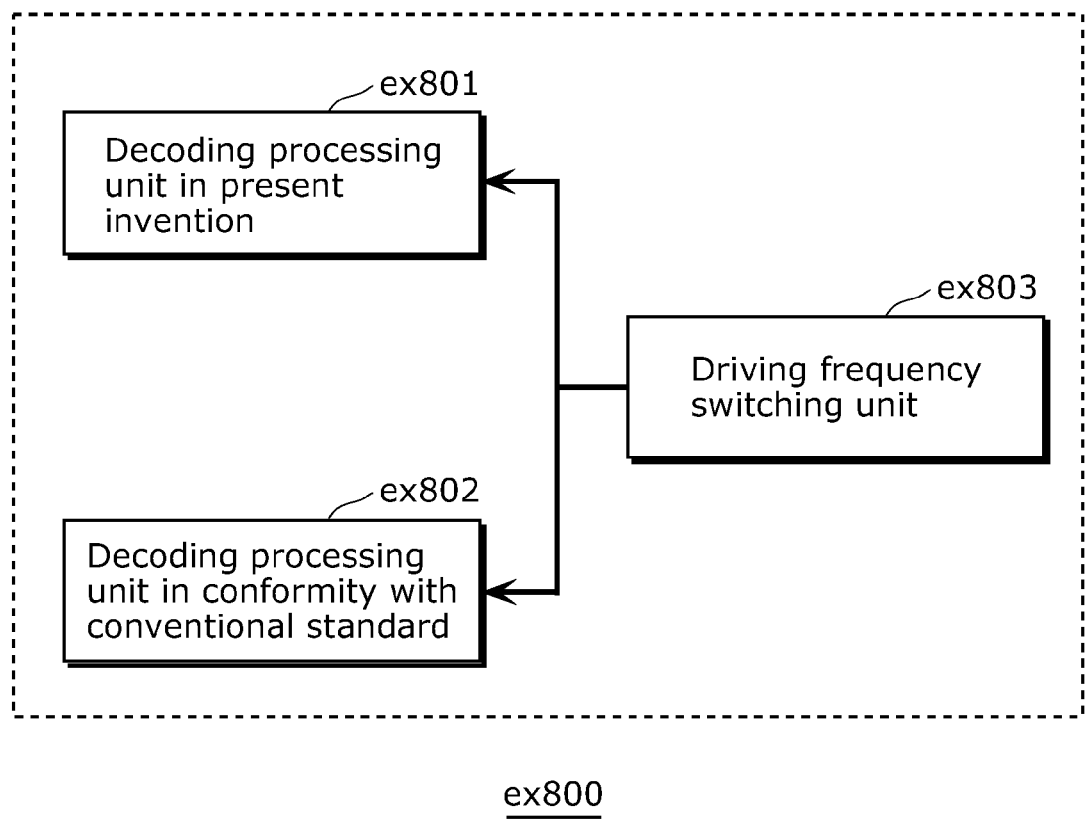
FIG. 26 is a diagram showing a configuration for switching between driving frequencies.

In order to solve the problem, the moving picture decoding apparatus, such as the television ex300 and the LSI ex500, is configured to determine to which standard the video data conforms, and switch between the driving frequencies according to the determined standard. FIG. 26 illustrates a configuration ex800 in the present embodiment. A driving frequency switching unit ex803 sets a driving frequency to a higher driving frequency when video data is generated by the moving picture coding method or the moving picture coding apparatus described in each of embodiments. Then, the driving frequency switching unit ex803 instructs a decoding processing unit ex801 that executes the moving picture decoding method described in each of embodiments to decode the video data. When the video data conforms to the conventional standard, the driving frequency switching unit ex803 sets a driving frequency to a lower driving frequency than that of the video data generated by the moving picture coding method or the moving picture coding apparatus described in each of embodiments. Then, the driving frequency switching unit ex803 instructs the decoding processing unit ex802 that conforms to the conventional standard to decode the video data.

Figure 28:
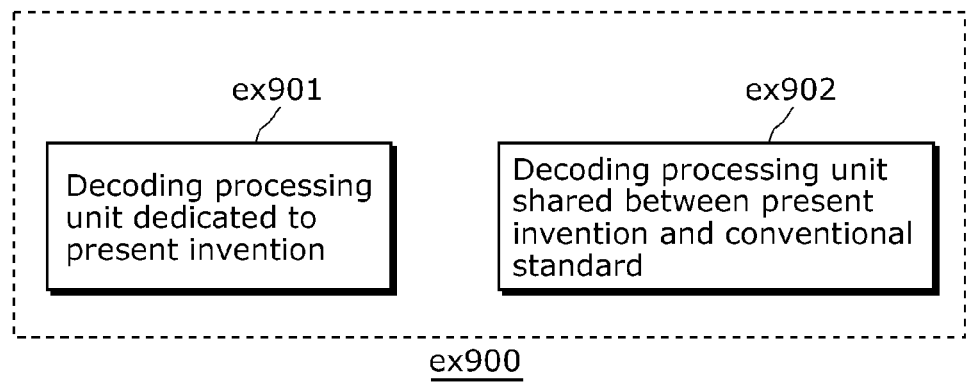
FIG. 28 is a diagram showing an example of a look-up table in which video data standards are associated with driving frequencies.

More specifically, the driving frequency switching unit ex803 includes the CPU ex502 and the driving frequency control unit ex512 in FIG. 25. Here, each of the decoding processing unit ex801 that executes the moving picture decoding method described in each of embodiments and the decoding processing unit ex802 that conforms to the conventional standard corresponds to the signal processing unit ex507 in FIG. 25. The CPU ex502 determines to which standard the video data conforms. Then, the driving frequency control unit ex512 determines a driving frequency based on a signal from the CPU ex502. Furthermore, the signal processing unit ex507 decodes the video data based on the signal from the CPU ex502. For example, the identification information described in Embodiment 3 is probably used for identifying the video data. The identification information is not limited to the one described in Embodiment 3 but may be any information as long as the information indicates to which standard the video data conforms. For example, when which standard video data conforms to can be determined based on an external signal for determining that the video data is used for a television or a disk, etc., the determination may be made based on such an external signal. Furthermore, the CPU ex502 selects a driving frequency based on, for example, a look-up table in which the standards of the video data are associated with the driving frequencies as shown in FIG. 28. The driving frequency can be selected by storing the look-up table in the buffer ex508 and in an internal memory of an LSI, and with reference to the look-up table by the CPU ex502.

Figure 27:
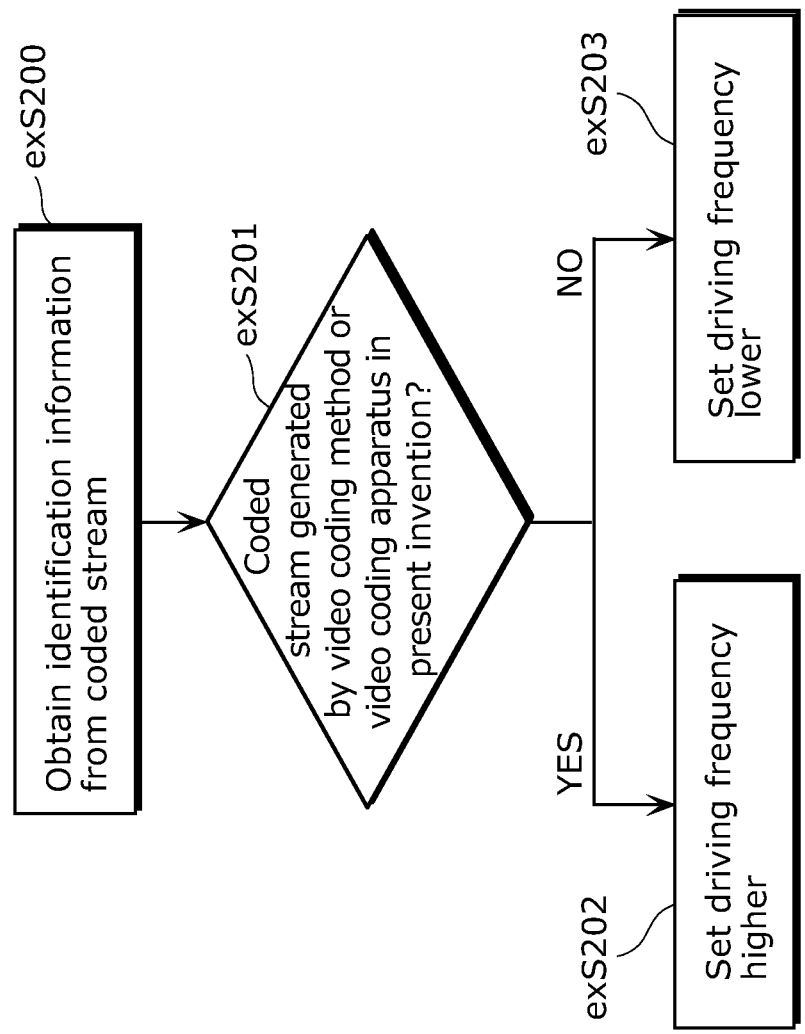
FIG. 27 is a diagram showing steps for identifying video data and switching between driving frequencies.

FIG. 27 illustrates steps for executing a method in the present embodiment. First, in Step exS200, the signal processing unit ex507 obtains identification information from the multiplexed data. Next, in Step exS201, the CPU ex502 determines whether or not the video data is generated by the coding method and the coding apparatus described in each of embodiments, based on the identification information. When the video data is generated by the moving picture coding method and the moving picture coding apparatus described in each of embodiments, in Step exS202, the CPU ex502 transmits a signal for setting the driving frequency to a higher driving frequency to the driving frequency control unit ex512. Then, the driving frequency control unit ex512 sets the driving frequency to the higher driving frequency. On the other hand, when the identification information indicates that the video data conforms to the conventional standard, such as MPEG-2, MPEG-4 AVC, and VC-1, in Step exS203, the CPU ex502 transmits a signal for setting the driving frequency to a lower driving frequency to the driving frequency control unit ex512. Then, the driving frequency control unit ex512 sets the driving frequency to the lower driving frequency than that in the case where the video data is generated by the moving picture coding method and the moving picture coding apparatus described in each of embodiment.

Furthermore, along with the switching of the driving frequencies, the power conservation effect can be improved by changing the voltage to be applied to the LSI ex500 or an apparatus including the LSI ex500. For example, when the driving frequency is set lower, the voltage to be applied to the LSI ex500 or the apparatus including the LSI ex500 is probably set to a voltage lower than that in the case where the driving frequency is set higher.

Furthermore, when the processing amount for decoding is larger, the driving frequency may be set higher, and when the processing amount for decoding is smaller, the driving frequency may be set lower as the method for setting the driving frequency. Thus, the setting method is not limited to the ones described above. For example, when the processing amount for decoding video data in conformity with MPEG-4 AVC is larger than the processing amount for decoding video data generated by the moving picture coding method and the moving picture coding apparatus described in each of embodiments, the driving frequency is probably set in reverse order to the setting described above.

Furthermore, the method for setting the driving frequency is not limited to the method for setting the driving frequency lower. For example, when the identification information indicates that the video data is generated by the moving picture coding method and the moving picture coding apparatus described in each of embodiments, the voltage to be applied to the LSI ex500 or the apparatus including the LSI ex500 is probably set higher. When the identification information indicates that the video data conforms to the conventional standard, such as MPEG-2, MPEG-4 AVC, and VC-1, the voltage to be applied to the LSI ex500 or the apparatus including the LSI ex500 is probably set lower. As another example, when the identification information indicates that the video data is generated by the moving picture coding method and the moving picture coding apparatus described in each of embodiments, the driving of the CPU ex502 does not probably have to be suspended. When the identification information indicates that the video data conforms to the conventional standard, such as MPEG-2, MPEG-4 AVC, and VC-1, the driving of the CPU ex502 is probably suspended at a given time because the CPU ex502 has extra processing capacity. In such a case, the suspending time is probably set shorter than that in the case where when the identification information indicates that the video data conforms to the conventional standard, such as MPEG-2, MPEG-4 AVC, and VC-1.

Accordingly, the power conservation effect can be improved by switching between the driving frequencies in accordance with the standard to which the video data conforms. Furthermore, when the LSI ex500 or the apparatus including the LSI ex500 is driven using a battery, the battery life can be extended with the power conservation effect.

Embodiment 6

There are cases where a plurality of video data that conforms to different standards, is provided to the devices and systems, such as a television and a cellular phone. In order to enable decoding the plurality of video data that conforms to the different standards, the signal processing unit ex507 of the LSI ex500 needs to conform to the different standards. However, the problems of increase in the scale of the circuit of the LSI ex500 and increase in the cost arise with the individual use of the signal processing units ex507 that conform to the respective standards.

Figure 29:
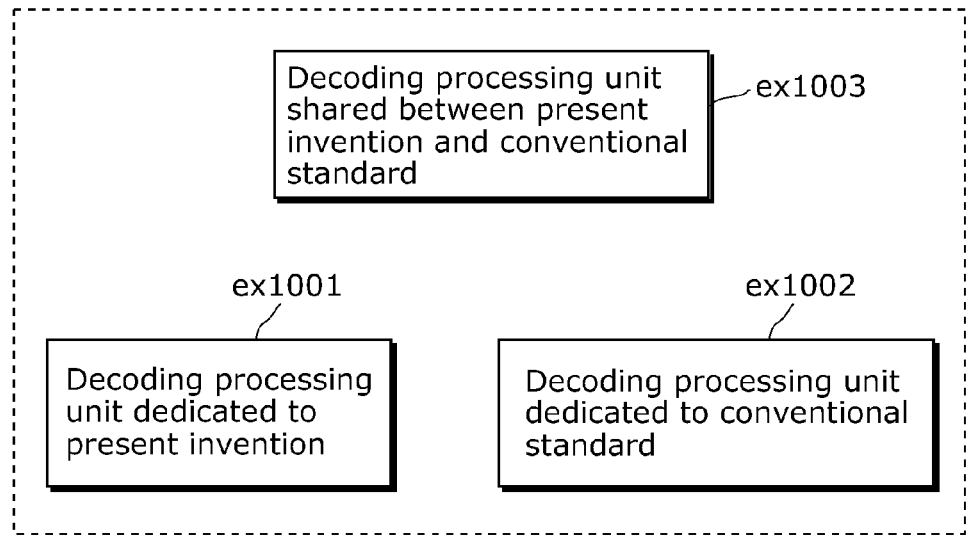
FIG. 29, in (a), is a diagram showing an example of a configuration for sharing a module of a signal processing unit, while FIG. 29, in (b), is a diagram showing another example of a configuration for sharing a module of the signal processing unit.

In order to solve the problem, what is conceived is a configuration in which the decoding processing unit for implementing the moving picture decoding method described in each of embodiments and the decoding processing unit that conforms to the conventional standard, such as MPEG-2, MPEG-4 AVC, and VC-1 are partly shared. Ex900 in (a) of FIG. 29 shows an example of the configuration. For example, the moving picture decoding method described in each of embodiments and the moving picture decoding method that conforms to MPEG-4 AVC have, partly in common, the details of processing, such as entropy coding, inverse quantization, deblocking filtering, and motion compensated prediction. The details of processing to be shared probably include use of a decoding processing unit ex902 that conforms to MPEG-4 AVC. In contrast, a dedicated decoding processing unit ex901 is probably used for other processing unique to an aspect of the present invention. Since the aspect of the present invention is characterized by motion compensation in particular, for example, the dedicated decoding processing unit ex901 is used for motion compensation. Otherwise, the decoding processing unit is probably shared for one of the entropy decoding, deblocking filtering, and motion compensation, or all of the processing. The decoding processing unit for implementing the moving picture decoding method described in each of embodiments may be shared for the processing to be shared, and a dedicated decoding processing unit may be used for processing unique to that of MPEG-4 AVC.

Furthermore, ex1000 in (b) of FIG. 29 shows another example in that processing is partly shared. This example uses a configuration including a dedicated decoding processing unit ex1001 that supports the processing unique to an aspect of the present invention, a dedicated decoding processing unit ex1002 that supports the processing unique to another conventional standard, and a decoding processing unit ex1003 that supports processing to be shared between the moving picture decoding method according to the aspect of the present invention and the conventional moving picture decoding method. Here, the dedicated decoding processing units ex1001 and ex1002 are not necessarily specialized for the processing according to the aspect of the present invention and the processing of the conventional standard, respectively, and may be the ones capable of implementing general processing. Furthermore, the configuration of the present embodiment can be implemented by the LSI ex500.

As such, reducing the scale of the circuit of an LSI and reducing the cost are possible by sharing the decoding processing unit for the processing to be shared between the moving picture decoding method according to the aspect of the present invention and the moving picture decoding method in conformity with the conventional standard.

INDUSTRIAL APPLICABILITY

The motion compensation apparatus according to the present invention generates an effect of implementing a high coding efficiency while reducing a memory transfer amount related to motion compensation, and can be applied to, for example, an image coding apparatus, an imaging decoding apparatus, a video camera, a mobile phone or a personal computer which have recording and reproduction functions.

REFERENCE SIGNS LIST 10, 11, 20, 21 Block
11a, 11b, 21a, 21b Sub-block
100, 1000 Image coding apparatus
101 Motion estimation unit
102 Frame memory
103, 104 Subtraction unit
105, 2200 Motion compensation unit
106, 1300 Coding unit
107, 121 Addition unit
108 Motion vector memory
109 Motion vector prediction unit
110 Motion compensation control unit
122 Decoding unit
123 Local reference memory
124 Transfer control unit
134 Extension transfer control unit
135 Temporary memory
136 Selector
200 Image decoding apparatus
1100 Unit of coding determination unit
1200 Motion vector determination unit
2000 Motion compensation apparatus
2100 Reference pixel readout unit
2300 Output unit
2400 Temporary storage unit

The invention claimed is:

1. A motion compensation method for performing motion compensation using a reference image stored in a frame memory to sequentially output prediction pixel data per block included in an image or per sub-block obtained by further dividing the block, the motion compensation method comprising:
in a case were a difference in processing order between a current block and a current sub-block is within a predetermined threshold range:
specifying, in the reference image, an area for use in motion compensation for each of the current block and the current sub-block which is spatially adjacent to the current block by using a motion vector for the current block, and collectively reading out reference pixel data of the specified area from the frame memory;
performing motion compensation using the reference pixel data read out in the reading out, to generate the prediction pixel data for each of the current block and the current sub-block;
outputting the prediction pixel data of the current block generated in the performing of motion compensation; and
temporarily storing the prediction pixel data of the current sub-block generated in the performing of motion compensation; and
in a case were the difference in processing order exceeds the predetermined threshold range:
specifying, in the reference image, the area for use in motion compensation for each of the current block and the current sub-block which is spatially adjacent to the current block by using the motion vector for the current block, and separately reading out the reference pixel data of the current block and the reference pixel data of the current sub-block from the reference frame;
performing motion compensation using the reference pixel data read out in the reading out, to separately generate the prediction pixel data for the current block and the prediction pixel data for the current sub-block; and
separately outputting the prediction pixel data of the current block and the prediction pixel data of the current sub-block generated in the performing of motion compensation.

2. The motion compensation method according to claim 1, wherein, in the collectively reading out, only when the difference in processing order between the current block and the current sub-block is within the predetermined threshold range, the reference pixel data for each of the current block and the current sub-block is read out from the frame memory.

3. The motion compensation method according to claim 1, wherein, in a case where the prediction pixel data of the current sub-block is output, (i) in a case where the motion vector of the current block matches a motion vector of the current sub-block, outputting the prediction pixel data of the current sub-block stored in the temporarily storing, and (ii) in a case where the motion vector of the current block does not match the motion vector of the current sub-block, in the separately reading out, the reference pixel data of the current sub-block is read out from the frame memory, the reference pixel data being in the reference image, in the performing of motion compensation, motion compensation is performed by using the reference pixel data read out in the separately reading out and the motion vector of the current sub-block, and the prediction pixel data of the current sub-block is separately generated, and in the separately outputting, the prediction pixel data of the current sub-block generated in the performing of motion compensation is output.

4. An image decoding method for decoding a coded stream to generate a decoded image, the image decoding method comprising:

the motion compensation method according to claim 1; and generating the decoded image from the coded stream, using the prediction pixel data which is output by the motion compensation method.

5. An image coding method for coding an image to generate a coded stream, the image coding method comprising:

the motion compensation method according to claim 1; and generating the coded stream from the image by using the prediction pixel data which is output in the motion compensation method.

6. An image coding method for sequentially coding a plurality of blocks included in an image, the image coding method comprising:

the motion compensation method according to claim 1;

determining a unit of coding for the current block by using the prediction pixel data which is output in the motion compensation method;

determining the motion vector of the current block for each unit of coding; and coding pixel data of the current block for each unit of coding by using the motion vector, wherein, in the determining of the unit of coding, in the case where a difference in coding order between an adjacent block which is an already coded block and is spatially adjacent to the current block and the current block is within a predetermined threshold range, it is determined that the unit of coding for the current block is a sub-block unit which is obtained by further dividing the current block, and in the determining of a motion vector, it is determined that in the current block, a motion vector of a sub-block on a side in contact with the adjacent block is identical to a motion vector of the adjacent block.

7. The image coding method according to claim 6, wherein, in the determining of a motion vector, in the case where the current block is divided into a left sub-block and a right sub-block, it is determined that a motion vector of the left sub-block of the current block is identical to a motion vector of the adjacent block which is adjacent to the left sub-block of the current block, and in the case where the current block is divided into a top sub-block and a bottom sub-block, it is determined that a motion vector of the top sub-block of the current block is identical to a motion vector of the adjacent block which is adjacent to the top sub-block of the current block.

8. A motion compensation apparatus which performs motion compensation using a reference image stored in a frame memory to sequentially output prediction pixel data per block included in an image or per sub-block obtained by further dividing the block, the motion compensation apparatus comprising:

a readout unit;

a motion compensation unit;

an output unit; and a temporary storage unit, wherein in a case were a difference in processing order between a current block and a current sub-block is within a predetermined threshold range:

the readout unit is configured to specify, in the reference image, an area for use in motion compensation for each of the current block and the current sub-block which is spatially adjacent to the current block using a motion vector of the current block, and to collectively read out reference pixel data of the specified area from the frame memory;

the motion compensation unit is configured to perform motion compensation using the reference pixel data read out in the readout unit and to generate the prediction pixel data for each of the current block and the current sub-block;

the output unit is configured to output the prediction pixel data of the current block generated by the motion compensation unit; and the temporary storage unit is configured to temporarily store the prediction pixel data of the current sub-block generated by the motion compensation unit, and in a case were the difference in processing order exceeds the predetermined threshold range:

the readout unit is configured to specify, in the reference image, the area for use in motion compensation for each of the current block and the current sub-block which is spatially adjacent to the current block by using the motion vector for the current block, and to separately read out the reference pixel data of the current block and the reference pixel data of the current sub-block from the frame memory;

the motion compensation unit is configured to perform motion compensation using the reference pixel data read out in the readout unit and to separately generate the prediction pixel data for the current block and the prediction pixel data for the current sub-block; and the output unit is configured to separately output the prediction pixel data of the current block and the prediction pixel data of the current sub-block.

9. A non-transitory computer-readable recording medium for use in a computer, the non-transitory computer-readable recording medium having a program recorded thereon, the program for performing motion compensation using a reference image stored in a frame memory to sequentially obtain prediction pixel data per block included in an image or per sub-block obtained by further dividing the block, the program causing a computer to execute:

in a case were a difference in processing order between a current block and a current sub-block is within a predetermined threshold range:

specifying, in the reference image, an area for use in motion compensation for each of the current block and the current sub-block which is spatially adjacent to the current block by using a motion vector of the current block, and collectively reading out reference pixel data of the specified area from the frame memory;

performing motion compensation using the reference pixel data read out in the reading out, to generate the prediction pixel data for each of the current block and the current sub-block;

outputting the prediction pixel data of the current block generated in the performing of motion compensation; and temporarily storing the prediction pixel data of the current sub-block generated in the performing of motion compensation; and in a case were the difference in processing order exceeds the predetermined threshold range:

specifying, in the reference image, the area for use in motion compensation for each of the current block and the current sub-block which is spatially adjacent to the current block by using the motion vector for the current block, and separately reading out the reference pixel data of the current block and the reference pixel data of the current sub-block from the reference frame;

performing motion compensation using the reference pixel data read out in the reading out, to separately generate the prediction pixel data for the current block and the prediction pixel data for the current sub-block; and separately outputting the prediction pixel data of the current block and the prediction pixel data of the current sub-block generated in the performing of motion compensation.

10. An integrated circuit which performs motion compensation using a reference image stored in a frame memory to sequentially output prediction pixel data per block included in an image or per sub-block obtained by further dividing the block, the integrated circuit comprising:

a readout unit;
a motion compensation unit;
an output unit; and
a temporary storage unit, wherein in a case were a difference in processing order between a current block and a current sub-block is within a predetermined threshold range:

the readout unit is configured to specify, in the reference image, an area for use in motion compensation for each of the current block and the current sub-block which is spatially adjacent to the current block using a motion vector of the current block, and to collectively read out reference pixel data of the specified area from the frame memory;

the motion compensation unit is configured to perform motion compensation using the reference pixel data read out in the readout unit and to generate the prediction pixel data for each of the current block and the current sub-block;

the output unit is configured to output the prediction pixel data of the current block generated by the motion compensation unit; and the temporary storage unit is configured to temporality store the prediction pixel data of the current sub-block generated by the motion compensation unit, and in a case were the difference in processing order exceeds the predetermined threshold range:

the readout unit is configured to specify, in the reference image, the area for use in motion compensation for each of the current block and the current sub-block which is spatially adjacent to the current block by using the motion vector for the current block, and to separately read out the reference pixel data of the current block and the reference pixel data of the current sub-block from the frame memory;

the motion compensation unit is configured to perform motion compensation using the reference pixel data read out in the readout unit and to separately generate the prediction pixel data for the current block and the prediction pixel data for the current sub-block; and the output unit is configured to separately output the prediction pixel data of the current block and the prediction pixel data of the current sub-block.

* * * * *